(12) United States Patent
Steele, Jr. et al.

(10) Patent No.: US 6,584,073 B1
(45) Date of Patent: Jun. 24, 2003

(54) NETWORK TOPOLOGIES

(75) Inventors: Guy L. Steele, Jr., Lexington, MA (US); Steven K. Heller, Chelmsford, MA (US); Jon Wade, Wellesley, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/323,963

(22) Filed: Jun. 2, 1999

(51) Int. Cl.[7] .......................... H04L 12/24; H04L 12/56
(52) U.S. Cl. ........................................ 370/254; 370/406
(58) Field of Search ................................. 370/254, 255, 370/257, 258, 406, 407

(56) References Cited

U.S. PATENT DOCUMENTS

| | | |
|---|---|---|
| 5,128,932 A | 7/1992 | Li |
| 5,453,978 A | 9/1995 | Sethu et al. |
| 5,602,839 A | 2/1997 | Annapareddy et al. |
| 5,680,116 A | 10/1997 | Hashimoto et al. |
| 5,721,819 A | 2/1998 | Galles et al. |
| 5,740,346 A | 4/1998 | Wicki et al. |
| 5,751,967 A * | 5/1998 | Raab et al. ................. 709/220 |
| 5,768,501 A | 6/1998 | Lewis |
| 5,781,546 A | 7/1998 | Sethu |
| 5,812,549 A | 9/1998 | Sethu |
| 5,859,981 A | 1/1999 | Levin et al. |
| 5,874,964 A | 2/1999 | Gille |
| 5,884,047 A | 3/1999 | Aikawa et al. |
| 5,914,953 A | 6/1999 | Krause et al. |
| 5,970,232 A | 10/1999 | Passint et al. |
| 6,005,860 A | 12/1999 | Anderson et al. |
| 6,031,835 A | 2/2000 | Abali et al. |
| 6,055,618 A | 4/2000 | Thorson |
| 6,064,671 A | 5/2000 | Killian |
| 6,097,718 A | 8/2000 | Bion |
| 6,137,781 A | 10/2000 | Goto et al. |
| 6,230,252 B1 | 5/2001 | Passint et al. |
| 6,243,760 B1 | 6/2001 | Armbruster et al. |
| 6,256,295 B1 * | 7/2001 | Callon ........................ 370/254 |
| 6,295,573 B1 | 9/2001 | Bailey et al. |

OTHER PUBLICATIONS

Whay C. Lee, "Topology Aggregation for Hierarchical Routing in ATM Networks." Apr. 1, 1995, pp. 82–92, Computer–Communication Review.

IBM, "Clustering Algorithm for Computer Network Management Graphics," Jun. 1988, pp. 71–79, IBM Technical Disclosure Bulletin, vol. 31, No. 1.

Peercy, M. et al., "Distributed Algorithms for Shortest–Path, Deadlock–Free Routing and Broadcasting in Arbitrarily Faulty Hypercubes," International Symposium on Fault Tolerant Computing Systems (FTCS), US, Los Alamitos, IEEE Comp. Soc. Press, vol. Symp. 20, Jun. 26, 1990, pp. 218–225.

Fleury, E. et al., "A General Theory for Deadlock Avoidance in Wormhole–Routed Networks," IEEE Trans. on Parallel and Distributed Systems, IEEE Inc., NY, vol. 9, No. 7, Jul. 1, 1998, pp. 626–638.

Pifarre G. D. et al., "Adaptive Deadlock–and Livelock–Free Routing in the Hypercube Network," IEEE Trans. on Parallel and Distributed Systems, IEEE Inc., NY, vol. 5, No. 11, Nov. 1, 1994, pp. 1121–1138.

* cited by examiner

Primary Examiner—Melvin Marcelo
(74) Attorney, Agent, or Firm—Finnegan, Henderson, Farabow, Garrett & Dunner, L.L.P.

(57) ABSTRACT

In accordance with methods and systems consistent with the present invention, a number of improved network topologies are provided that have been selected to improve network performance based on various performance characteristics. The topologies are also selected to facilitate network reconfiguration, including adding nodes and removing, nodes. As a result, the network topologies in accordance with methods and systems consistent with the present invention do not follow a rigid, predefined pattern; rather, these topologies have been selected for network performance purposes as well as reconfiguration purposes.

82 Claims, 16 Drawing Sheets

NETWORK TOPOLOGIES

RELATED APPLICATIONS

The following identified U.S. patent applications are relied upon and are incorporated by reference in this application.

U.S. patent application Ser. No. 09/323,696, entitled "Deadlock-Free Routing," filed on even date herewith, assigned to a common assignee.

U.S. patent application Ser. No. 09/323,964, entitled "Dynamic Generation of Deadlock-Free Routings," filed on even date herewith, assigned to a common assignee.

U.S. patent application Ser. No. 09/323,965, entitled "Recursive Partitioning of Networks," filed on even date herewith, assigned to a common assignee.

U.S. patent application Ser. No. 09/323,962, entitled "Improved Network Reconfiguration," filed on even date herewith, assigned to a common assignee.

FIELD OF THE INVENTION

The present invention relates generally to data processing systems and, more particularly, to improved network topologies.

BACKGROUND OF THE INVENTION

A "network topology" refers to the structure that provides the communications interconnection among nodes of a network. As used herein, the term "node" refers to any device capable of communicating, such as a computer, router, switch, network processor, or symmetric multiprocessor. Thus, the topology of a network refers to the network's particular configuration of links and nodes.

Conventional systems for configuring networks utilize a predefined pattern that easily extends to accommodate large numbers of nodes. When configuring a network, the pattern dictates the network topology to be used based on the number of nodes. For example, one such conventional system for configuring networks that uses predefined patterns is the hypercube system. As shown in FIG. 1, the hypercube system accommodates only networks with a number of nodes that can be expressed as a power of 2. Accordingly, FIG. 1 depicts the hype rube network topology of networks having 2, 4, 8, and 16 nodes. The pattern that the hypercube system uses is apparent from an examination of the different topologies.

Following a predefined pattern provides a convenient, scalable method for configuring networks, but it ignores network performance. As a result, network performance may suffer. It is thus desirable to improve the manner in which networks are configured.

SUMMARY OF THE INVENTION

In accordance with methods and systems consistent with the present invention, a number of improved network topologies are provided that have been selected to improve network performance based on various performance characteristics. These topologies have also been selected based on the ease with which the network can be reconfigured, including adding nodes and removing nodes. As a result, the network topologies in accordance with methods and systems consistent with the present invention do not follow a rigid, predefined pattern; rather, these topologies have been selected to improve network performance and facilitate reconfiguration.

In accordance with methods consistent with the present invention, a method is provided for distributed system configuration. According to this method, a set of network topologies for groups of nodes is created, where each network topology is associated with one of the groups of nodes, and each group has a different number of nodes. Each network topology is configured to improve network performance of the associated group of nodes based on performance characteristics and does not fully connect the associated group of nodes. Furthermore, this method selects one of the network topologies for a network and then configures the network using the selected topology.

In accordance with methods consistent with the present invention, a method is provided for distributed system configuration. According to this method, a set of network topologies for groups of nodes is created, where each network topology is associated with one of the groups of nodes, and each group has a different number of nodes. Each network topology is configured to facilitate reconfiguration of the associated group and does not fully connect the associated group. Furthermore, this method selects one of the network topologies for a network based on the number of nodes in the network and then configures the network using the selected topology.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

In accordance with methods and systems consistent with the present invention, improved network topologies are provided that seek to improve network performance and facilitate network reconfiguration. These network topologies have been selected based on various network performance characteristics like throughput, thus increasing the performance of the network. Additionally, these network topologies are selected to facilitate the addition (upgrade) or removal (downgrade) of one or more nodes. In most of the topologies, this reconfiguration requires a minimal amount of recabling. Moreover, the reconfiguration occurs in a manner such that the network remains operational during the reconfiguration. Thus, network topologies in accordance with methods and systems consistent with the present invention typically perform better than conventional network configurations and are more easily upgradable and downgradable.

Figure 1A:
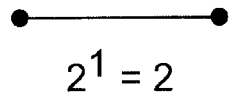
FIG. 1A depicts the network topologies for a number of hypercube networks.
Figure 1A:
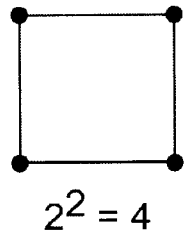
Figure 1A:
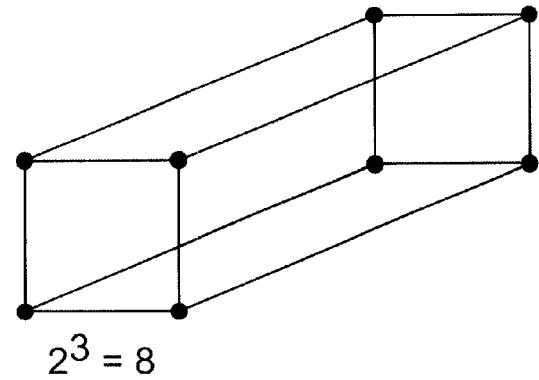
Figure 1A:
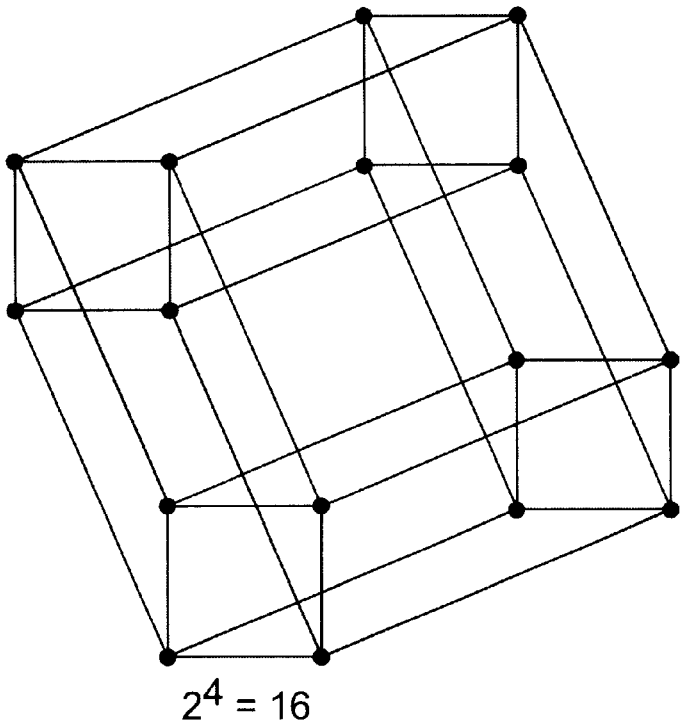

The network topologies in accordance with methods and systems consistent with the present invention are selected based upon a number of network performance characteristics including diameter, symmetry, bisection bandwidth, and path length. The "diameter" of a network refers to the longest path between any two pairs of nodes. For example, the diameter of the hypercube topology for a network of eight devices (shown in FIG. 1A) is three, because each node can be reached from any other node by traversing three links at most. The network topologies in accordance with methods and systems consistent with the present invention have a diameter of two, so that in all of the topologies described below, two links at most need to be traversed when communicating between any two nodes. Such a low diameter significantly reduces communications overhead by reducing the number of links traversed, thus providing increased throughput.

The "symmetry" of a network refers to both node symmetry and edge symmetry. A network is node symmetric when for each pair of nodes there is an automorphism of the network that maps the first node to the second node. An "automorphism" refers to a permutation of the nodes that preserves the link or edge relationships. A network is edge symmetric when for each pair of edges there is an automorphism of the network that maps the first edge to the second edge. A network that is both node and edge symmetric is typically well load-balanced. Wherever feasible, the network topologies in accordance with methods and systems consistent with the present invention are both node and edge symmetric.

"Bisection bandwidth" refers to the minimum bandwidth for all possible partitions into two equal-sized groups of nodes. The bisection bandwidth for a network provides an indication of whether the network contains bottlenecks. For example, consider the configuration of network 100 shown in FIG. 1A.

Figure 1B:
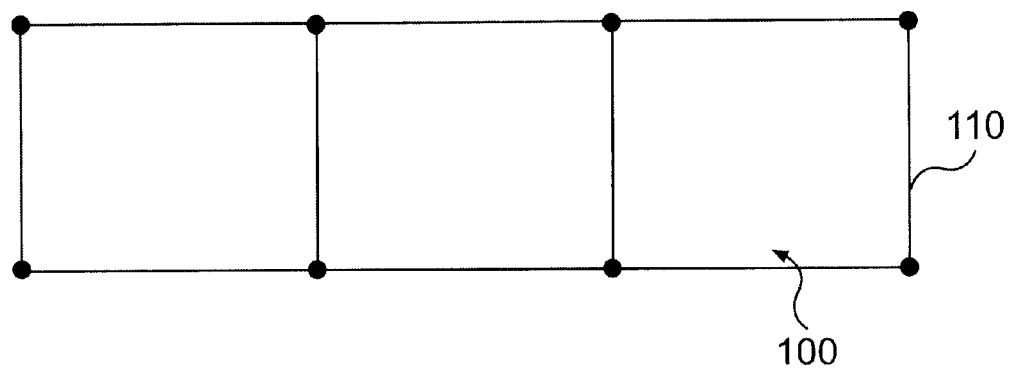
FIGS. 1B, 1C, and 1D depict exemplary configurations of a network consistent with certain aspects related to the present invention.
Figure 1C:
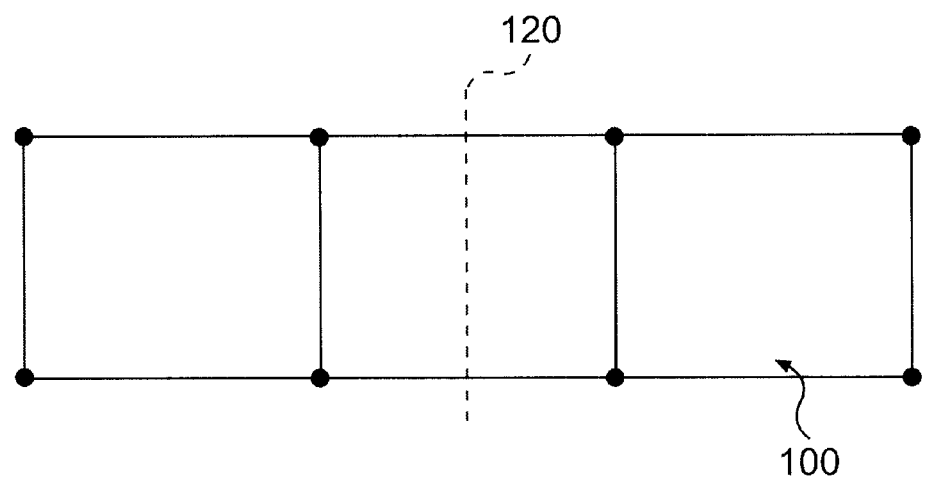

As shown in FIG. 1B, network 100 includes eight nodes interconnected by communication links 110. Network 100 can be formed into two groups of equal size by dividing it vertically as shown in FIG. 1C (e.g., division 120).

Given division 120, the bandwidth for network 100 is two, indicating the number of links that cross the group boundary. Further, network 100 can also be formed into two groups of equal size by dividing it horizontally as shown in FIG. 1D (e.g., division 130).

Figure 1D:
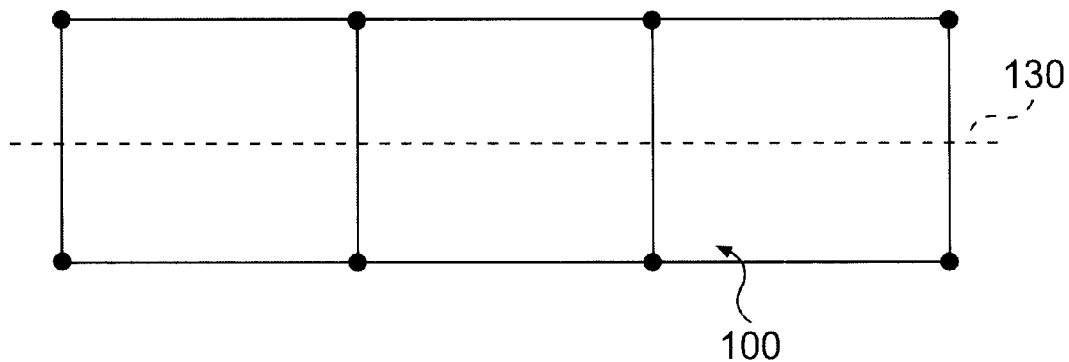

Dividing the network as shown in FIG. 1D renders a bandwidth of four because four links cross the group boundary. Given these calculations, to determine the bisection bandwidth for this network, the minimum bandwidth for all groupings of equal size is determined. In this example, the bisection bandwidth is two. The network topologies in accordance with methods and systems consistent with the present invention have been selected to maximize their bisection bandwidth.

The "path length" refers to the average number of links that must be traversed between any two nodes. As such, the path length for a network indicates the amount of communication overhead associated with a communication. The network topologies in accordance with methods and systems consistent with the present invention have low path lengths ranging from 1.19 to 1.67, indicating that a low level of communications overhead is incurred.

Implementation Details

Figure 2:
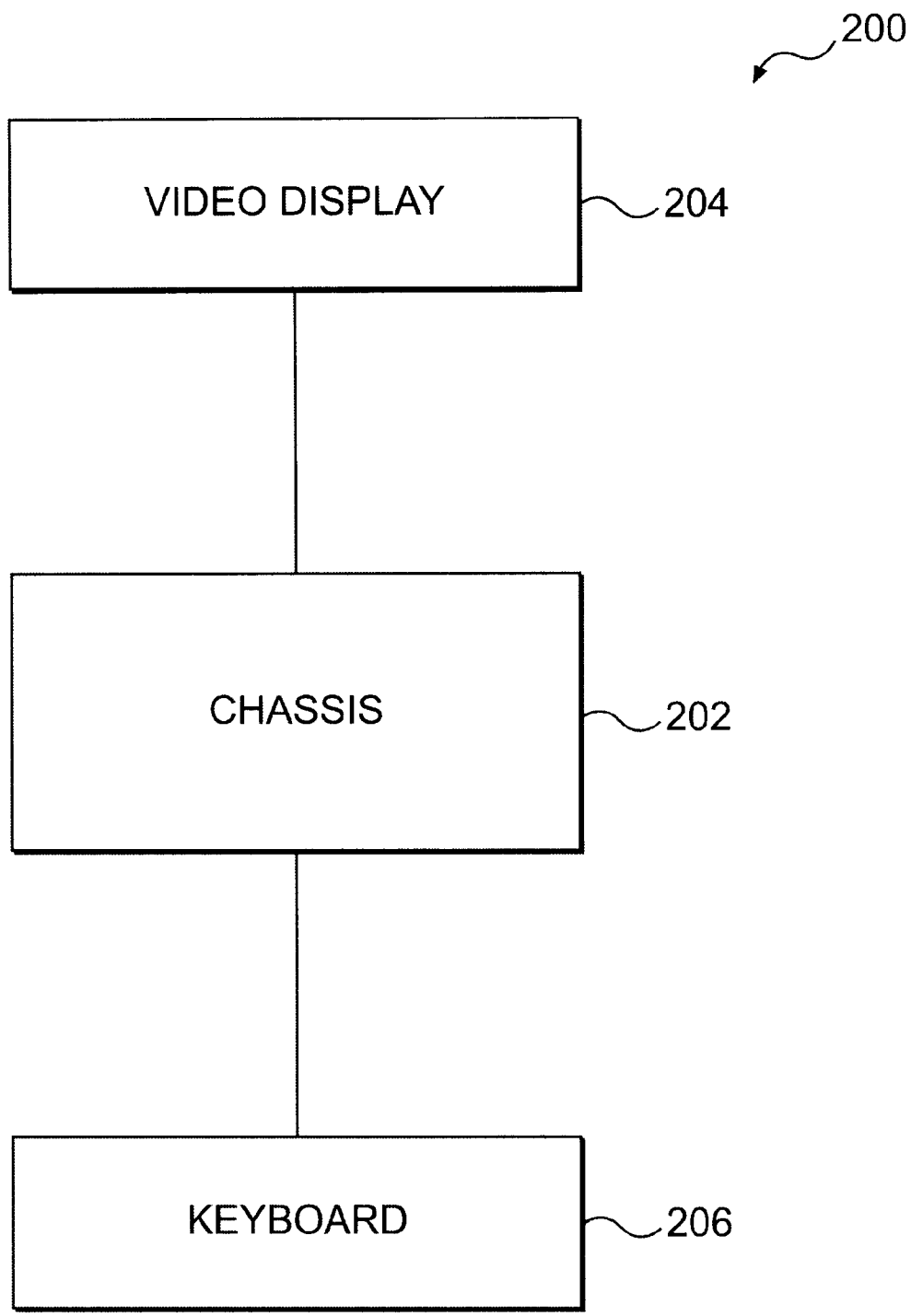
FIG. 2 depicts a data processing system suitable for use with methods and systems consistent with the present invention.

FIG. 2 depicts a data processing system 200 suitable for use with methods and systems consistent with the present invention. Data processing system 200 contains a chassis 202 connected to a video display 204 and a keyboard 206. Data processing system 200 is suitable for use as one or more nodes in the network topologies described below.

Figure 3:
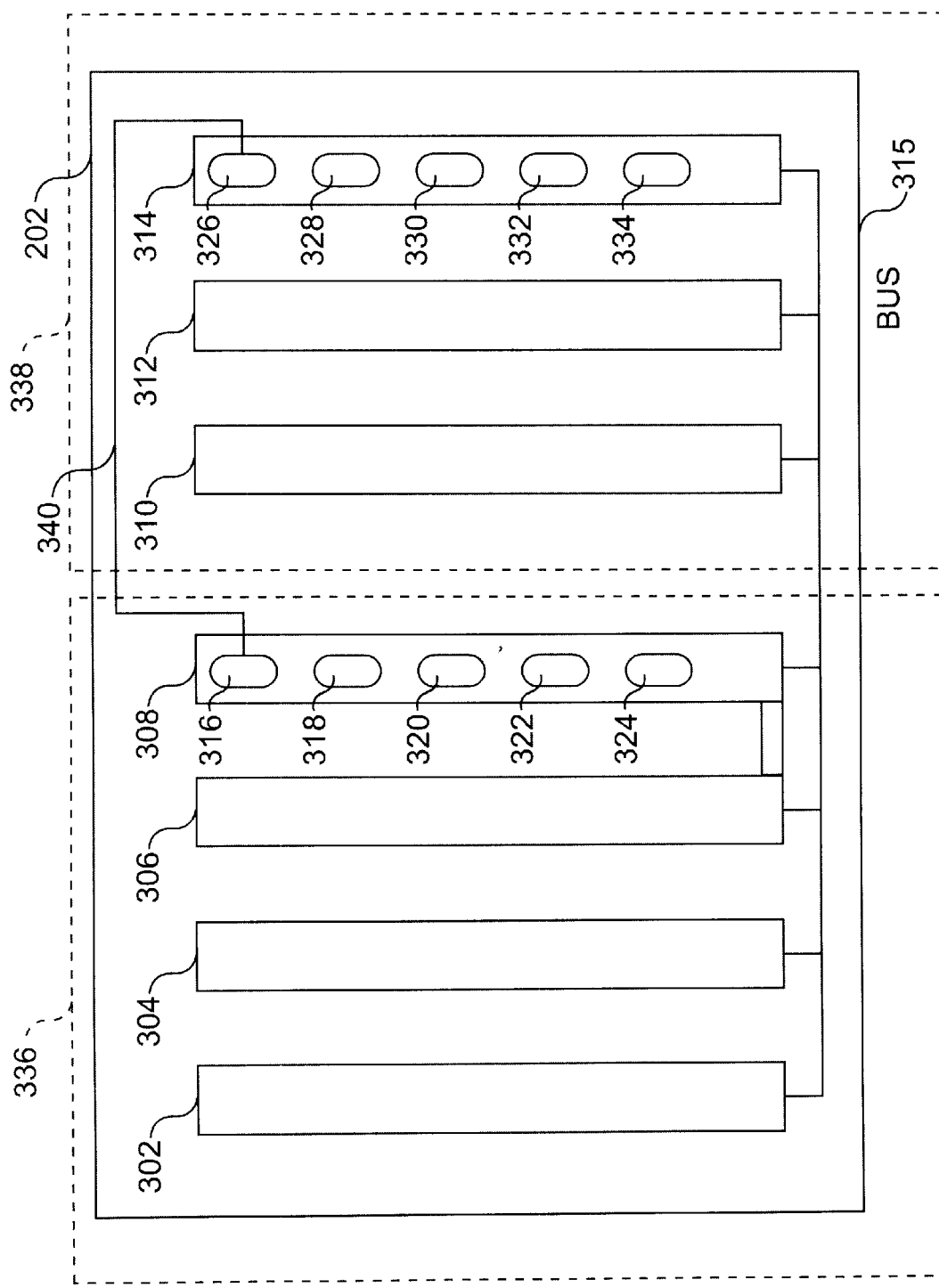
FIG. 3 depicts a more detailed diagram of the chassis of FIG. 2.

As shown in FIG. 3, chassis 202 contains up to seven cards 302–314 interconnected via bus 315. Of these cards, cards 308 and 314, known as routing cards, perform routing functionality with each having five ports 316–324 and 326–334 that connect to a communication link (e.g., a cable). The cards other than the routing cards (i.e., cards 302–306, 310, and 312) typically contain multiple CPUs, memory, and secondary storage. In accordance with methods and systems consistent with the present invention, cards 302–308 form a single node 336. Likewise, cards 310–314 form a single node 338. Nodes 336 and 338 are referred to as partner nodes because they are both located in the same chassis 202. Since node 336 and node 338 are separate communications nodes, they may be interconnected via a communications link 340, known as a partner link. A partner link is used to transfer control information between two partner nodes: the actual data is transferred via the bus 315 for faster communications. One skilled in the art will appreciate that data processing system 200 and chassis 202 may include additional or different components.

Figure 4:
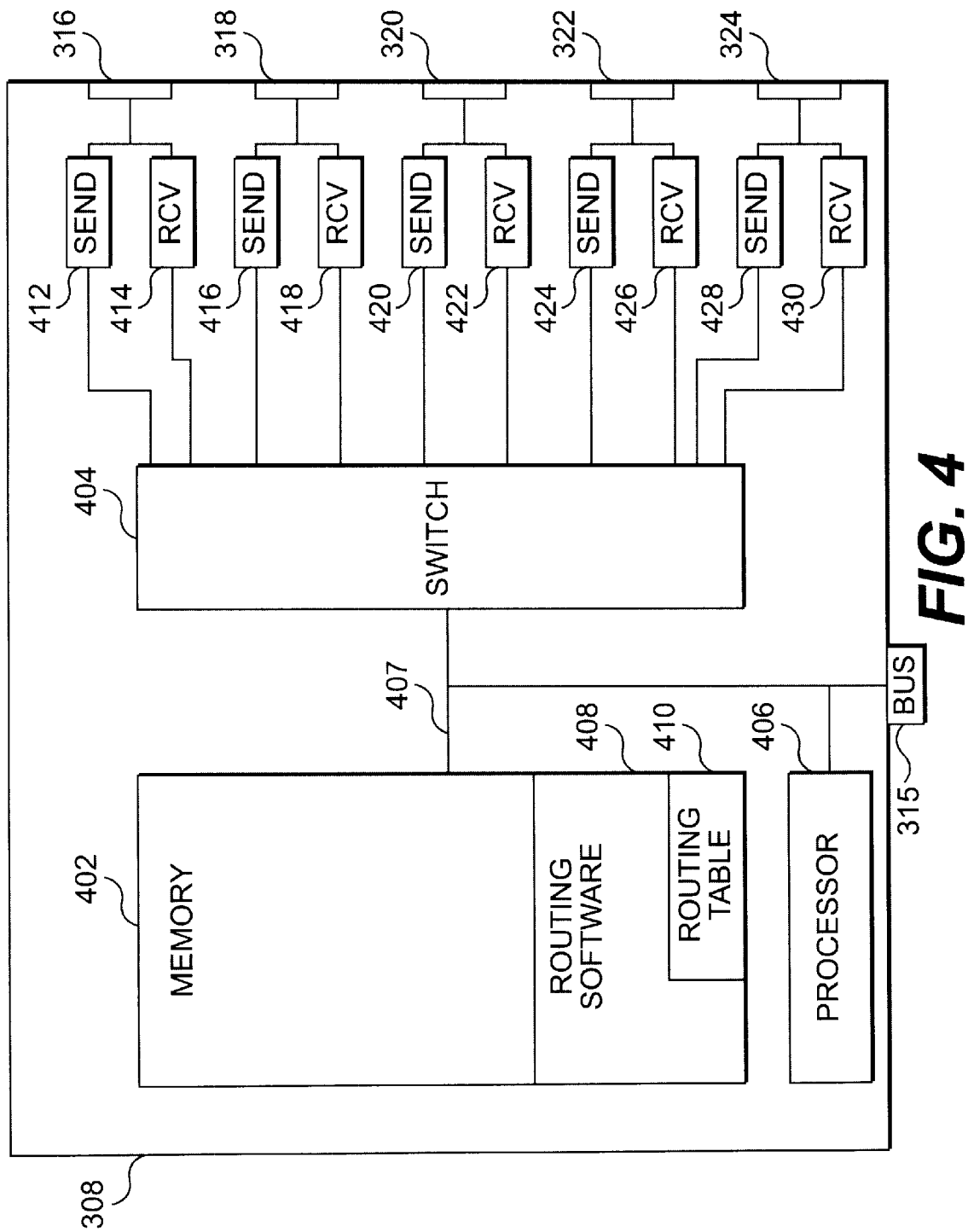
FIG. 4 depicts a more detailed diagram of a routing card depicted in FIG. 3.

FIG. 4 depicts a more detailed diagram of routing card 308, although routing card 314 is similarly configured. Routing card 308 contains a memory 402, a switch 404, and a processor 406 interconnected by an internal bus 407, which also connects to bus 315. Memory 402 contains routing software 408 that routes traffic through the network using routing table 410. The switch coordinates the sending and receiving of information across the network via ports 316–324 by using a send and receive buffer 412–430 for each port.

Although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from a network, such as the Internet; or other forms of RAM or ROM either currently known or later developed. Sun, Sun Microsystems, the Sun logo, Java™, and Java™-based trademarks are trademarks or registered trademarks of Sun Microsystems, Inc. in the United States and other countries.

Network Topologies

In accordance with methods and systems consistent with the present invention, a number of network topologies are provided where the topologies have been selected based on both performance characteristics (including diameter, symmetry, bisection bandwidth, and path length) and the ease with which the network can be reconfigured. Network topologies for networks having seven to sixteen nodes are presented below with exemplary routing tables. The topologies for networks having less than seven nodes are not presented, because they are fully connected. That is, since each routing card has five ports, in networks of six or less nodes, each node can be connected to each other node. In such a situation, the network is referred to as being fully connected.

Figure 5:
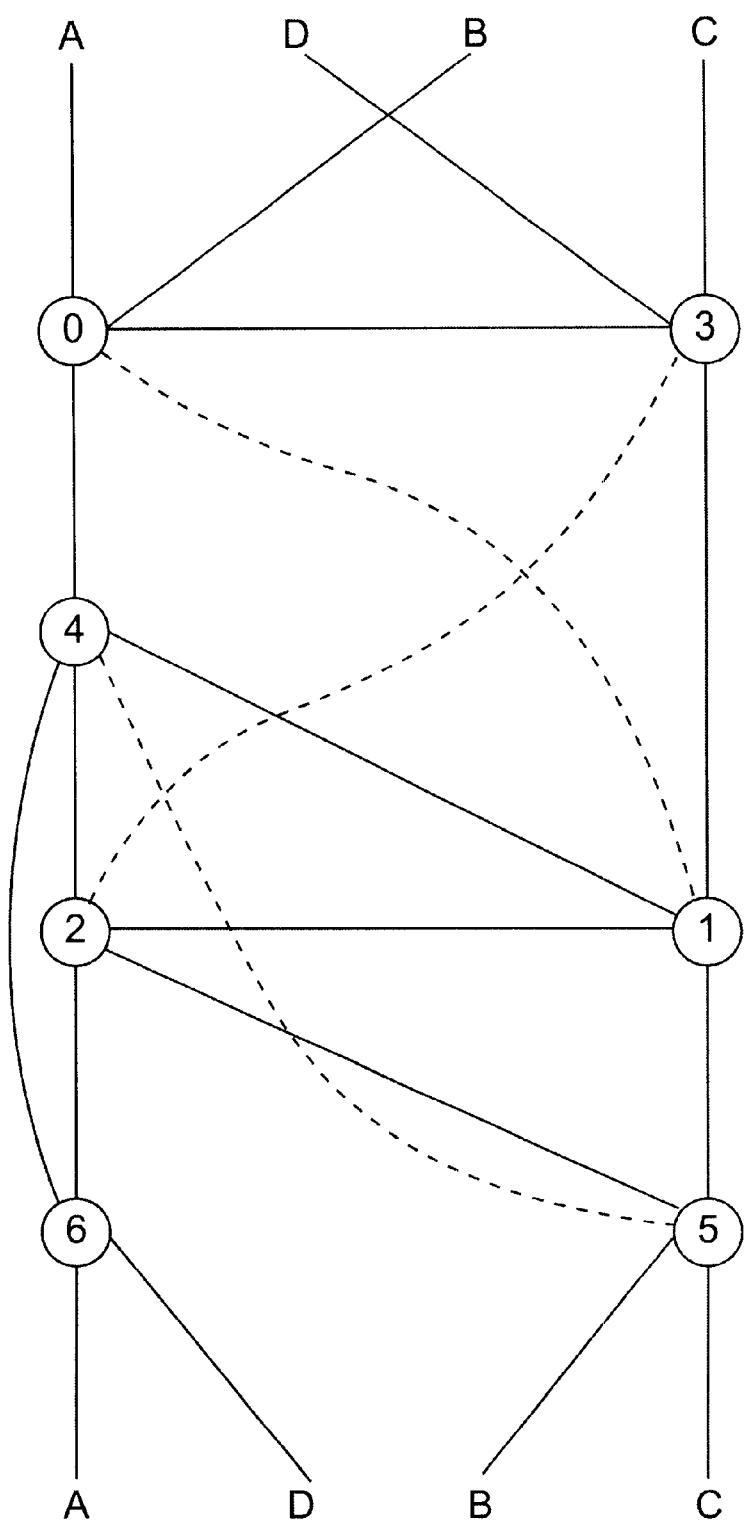
FIG. 5 depicts a network topology for a network of 7 nodes in accordance with methods and systems consistent with the present invention.

FIG. 5 depicts a network-topology for a network of seven nodes in accordance with methods and systems consistent with the present invention. Each node, node 0 through node 6, has up to five links to other nodes. Each link is depicted as either a solid line or a dashed line. A solid line indicates that the link is a nonpartner link; a dashed line indicates that the link is a partner link between partner nodes. Accordingly, the two partner nodes are contained in the same device. In FIG. 5, the letters (e.g., "A") indicate a continuing connection to another like-lettered node. For example, node 0 is connected to node 6.

As shown in FIG. 5, node 0 has a partner link with node 1 and directly connects to nodes 3, 4, 5, and 6. Node 1 has a partner link with node 0 and directly connects to nodes 2, 3, 4, and 5. Node 2 has a partner link with node 3 and directly connects to nodes 1, 4, 5, and 6. Node 3 has a partner link with node 2 and directly connects to nodes 0, 1, 5, and 6. Node 4 has a partner link with node 5 and directly connects to nodes 0, 1, 2, and 6. Node 5 has a partner link with node 4 and directly connects to nodes 0, 1, 2, and 3, and node 6 directly connects to nodes 0, 2, 3, and 4. Below is a sample routing table for this network. The first row of this table, for example, shows that data from node 0 may be sent directly to nodes 1, 3, 4, 5, and 6 and that data from node 0 may be sent to node 2 via node 3.

| FROM\TO | 0 | 1 | 2 | 3 | 4 | 5 | 6 |
|---|---|---|---|---|---|---|---|
| 0 |   | — | 3 | — | — | — | — |
| 1 | — |   | — | — | — | — | 4 |
| 2 | 1 | — |   | — | — | — | — |
| 3 | — | — | — |   | 5 | — | — |
| 4 | — | — | — | 2 |   | — | — |
| 5 | — | — | — | — | — |   | 3 |
| 6 | — | 0 | — | — | — | 4 |   |

Figure 6:
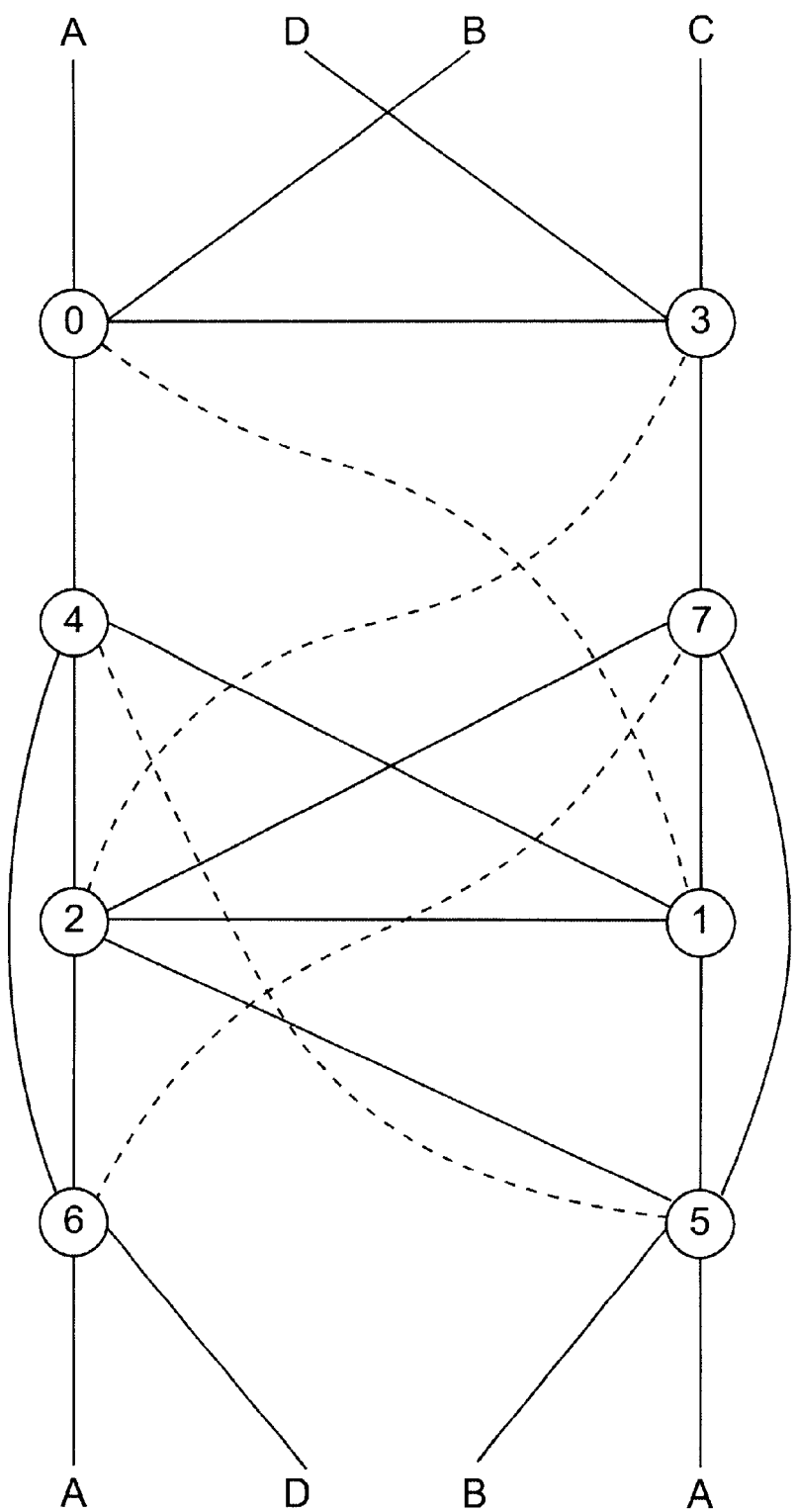
FIG. 6 depicts a network topology for a network of 8 nodes in accordance with methods and systems consistent with the present invention.

FIG. 6 depicts a network topology for a network of 8 nodes in accordance with methods and systems consistent with the present invention. As shown in FIG. 6, node 0 has a partner link with node 1 and directly connects to nodes 3 through 6. Node 1 has a partner link with node 0 and directly connects to nodes 2, 4, 5, and 7. Node 2 has a partner link with node 3 and directly connects to nodes 1, 4, 6, and 7. Node 3 has a partner link with node 2 and directly connects to node 0 and nodes 5 through 7. Node 4 has a partner link with node 5 and directly connects to nodes 0–2 and 6. Node 5 has a partner link with node 4 and directly connects to nodes 0, 1, 3, and 7. Node 6 has a partner link with node 7 and directly connects to nodes 0 and 2–4 and node 7 has a partner link with node 6 and directly connects to nodes 1–3 and 5. Below is an exemplary routing table for this network.

| FROM\TO | 0 | 1 | 2 | 3 | 4 | 5 | 6 | 7 |
|---|---|---|---|---|---|---|---|---|
| 0 |   | — | 3 | — | — | — | — | 6 |
| 1 | — |   | — | 2 | — | — | 7 | — |
| 2 | 1 | — |   | — | — | 4 | — | — |
| 3 | — | 0 | — |   | 5 | — | — | — |
| 4 | — | — | — | 2 |   | — | — | 6 |
| 5 | — | — | 3 | — | — |   | 7 | — |
| 6 | — | 0 | — | — | — | 4 |   | — |
| 7 | 1 | — | — | — | 5 | — | — |   |

Figure 7:
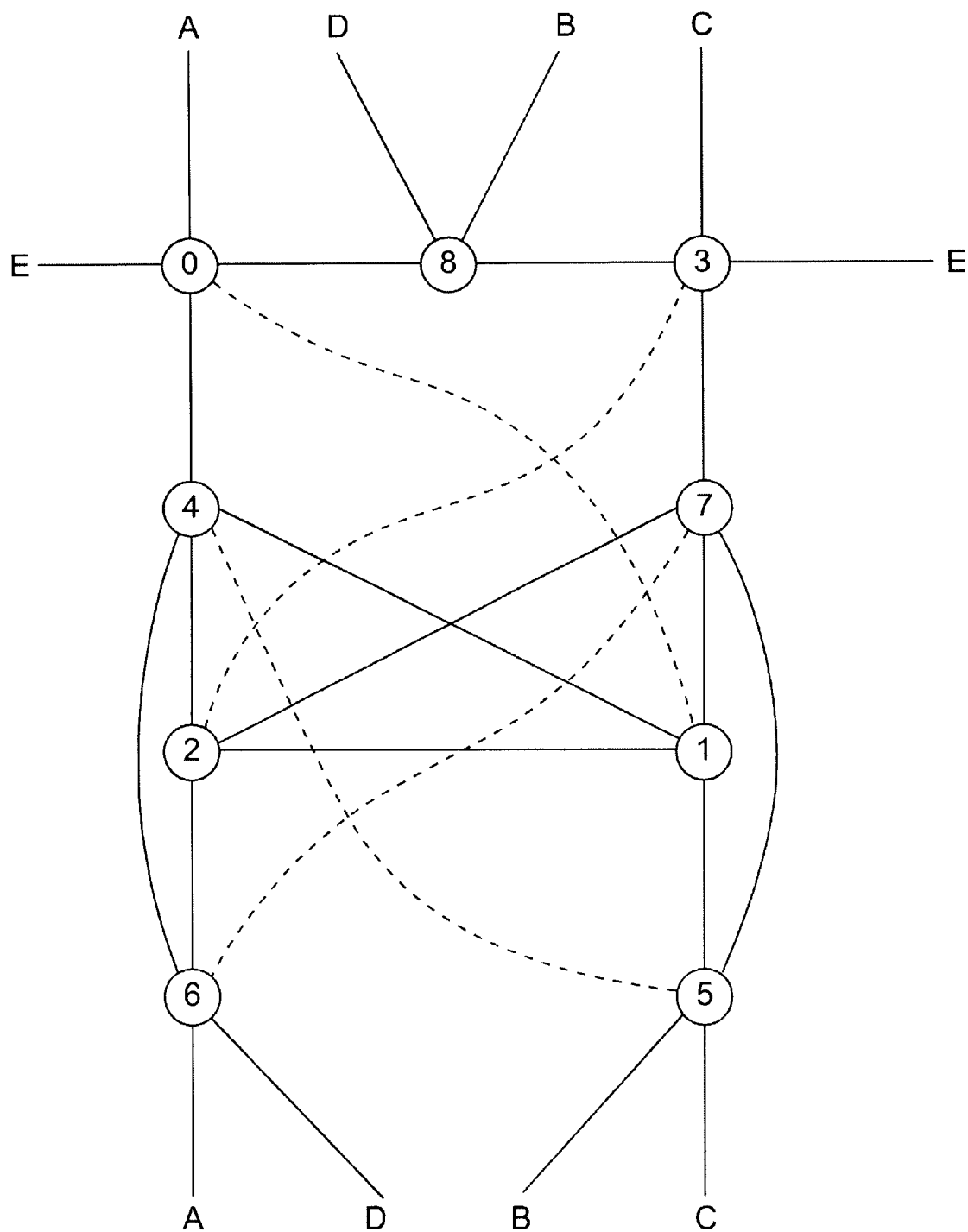
FIG. 7 depicts a network topology for a network; of 9 nodes in accordance with methods and systems consistent with the present invention.

FIG. 7 depicts a network topology for a network of 9 nodes in accordance with methods and systems consistent with the present invention. As shown in FIG. 7, node 0 has a partner link with node 1 and directly connects to nodes 3, 4, 6, and 8. Node 1 has a partner link with node 0 and directly connects to nodes 2, 4, 5 and 7. Node 2 has a partner link with node 3 and directly connects to nodes 1, 4, 6, and 7. Node 3 has a partner link with node 2 and directly connects to nodes 0, 5, 7, and 8. Node 4 has a partner link with node 5 and directly connects to nodes 0–2 and 6. Node 5 has a partner link with node 4 and directly connects to nodes. 1, 3, 7, and 8. Node 6 has a partner link with node 7 and directly connects to nodes 0, 2, 4, and 8. Node 7 has a partner link with node 6 and directly connects to nodes 1–3 and 5, and node 8 directly connects to nodes 0, 3, 5, and 6. Below is an exemplary routing table.

| FROM\TO | 0 | 1 | 2 | 3 | 4 | 5 | 6 | 7 | 8 |
|---|---|---|---|---|---|---|---|---|---|
| 0 |   | — | 3 | — | — | 4 | — | 6 | — |
| 1 | — |   | — | 2 | — | — | 7 | — | 5 |
| 2 | 1 | — |   | — | — | 4 | — | — | 6 |
| 3 | — | 0 | — |   | 5 | — | 7 | — | — |
| 4 | — | — | — | 2 |   | — | — | 6 | 0 |
| 5 | 1 | — | 3 | — | — |   | 7 | — | — |
| 6 | — | 0 | — | 2 | — | 4 |   | — | — |
| 7 | 1 | — | — | — | 5 | — | — |   | 3 |
| 8 | — | 0 | 3 | — | 5 | — | — | 6 |   |

Figure 8:
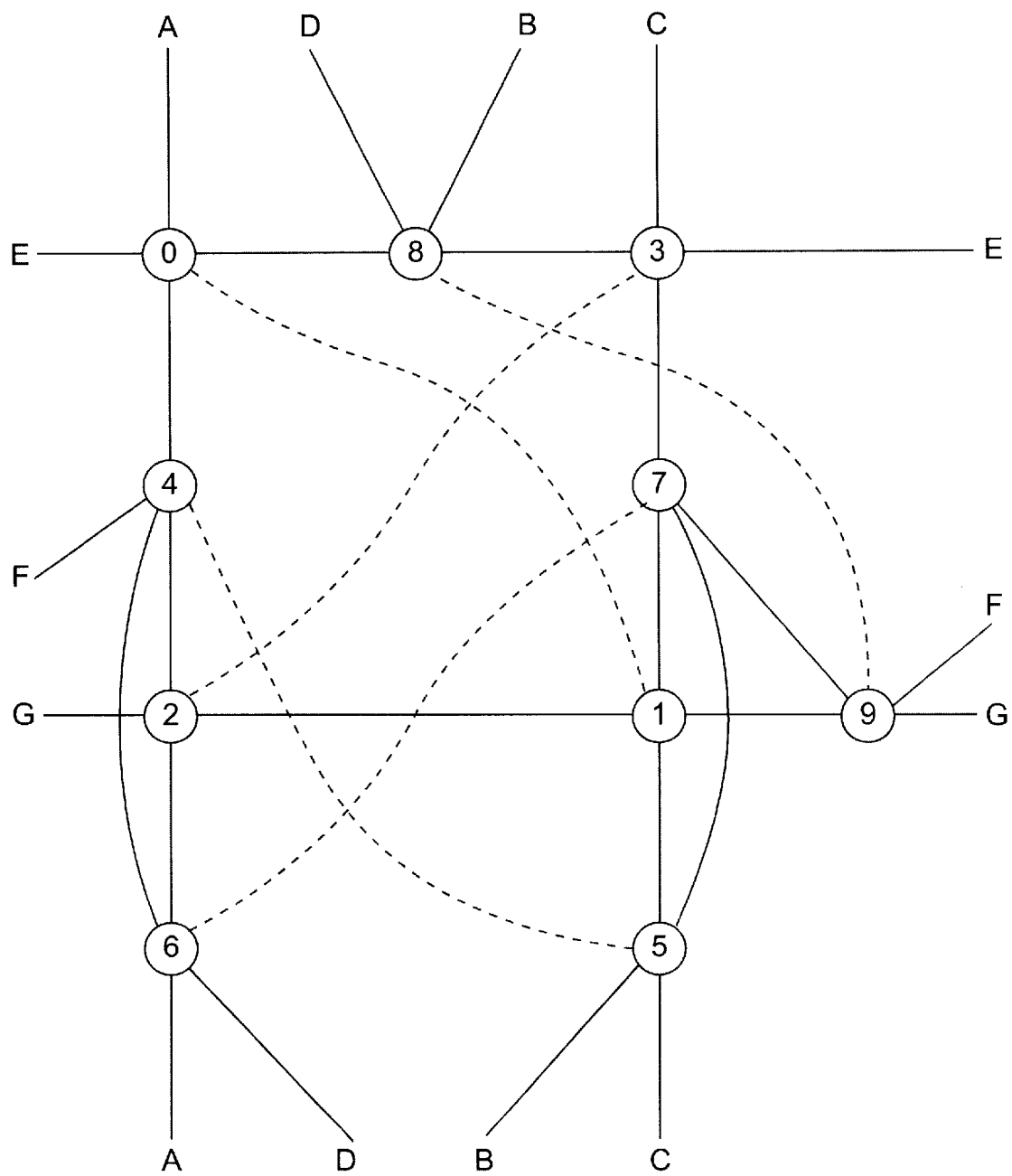
FIG. 8 depicts a network topology for a network of 10 nodes in accordance with methods and systems consistent with the present invention.

FIG. 8 depicts a network topology for a network of 10 nodes in accordance with methods and system consistent with the present invention. As shown in FIG. 8, node 0 has a partner link with node 1 and directly connects to nodes 3, 4, 6, and 8. Node 1 has a partner link with node 0 and directly connects to nodes 2, 5, 7, and 9. Node 2 has a partner link with node 3 and directly connects to nodes 1, 4, 6, and 9. Node 4 has a partner link with node 2 and directly connects to nodes 0, 5, 7, and 8. Node 4 has a partner link with node 5 and directly connects to nodes 0, 2, 6, and 9. Node 5 has a partner link with node 4 and directly connects to nodes 1, 3, 7, and 8. Node 6 has a partner link with node 7 and directly connects to nodes 0, 2, 4, and 8. Node 7 has a partner link with node 6 and directly connects to nodes 1, 3, 5, and 9. Node 8 has a partner link with node 9 and directly connects to nodes 0, 3, 5, and node 9 has a partner link with node 8 and directly connects to nodes 1, 2, 4, and 7. Below is an exemplary routing table for this network.

| FROM\TO | 0 | 1 | 2 | 3 | 4 | 5 | 6 | 7 | 8 | 9 |
|---|---|---|---|---|---|---|---|---|---|---|
| 0 |   | — | 3 | — | — | 4 | — | 6 | — | 8 |
| 1 | — |   | — | 2 | 5 | — | 7 | — | 9 | — |
| 2 | 1 | — |   | — | — | 4 | — | 6 | 9 | — |
| 3 | — | 0 | — |   | 5 | — | 7 | — | — | 8 |

-continued

| FROM\TO | 0 | 1 | 2 | 3 | 4 | 5 | 6 | 7 | 8 | 9 |
|---|---|---|---|---|---|---|---|---|---|---|
| 4 | — | 0 | — | 2 | — | — | — | 6 | 9 | — |
| 5 | 1 | — | 3 | — | — | — | 7 | — | — | 8 |
| 6 | — | 0 | — | 2 | — | 4 | — | — | — | 8 |
| 7 | 1 | — | 3 | — | 5 | — | — | — | 9 | — |
| 8 | — | 0 | 3 | — | 5 | — | 6 | — | — | — |
| 9 | 1 | — | — | 2 | — | 4 | 7 | — | — | — |

Figure 9:
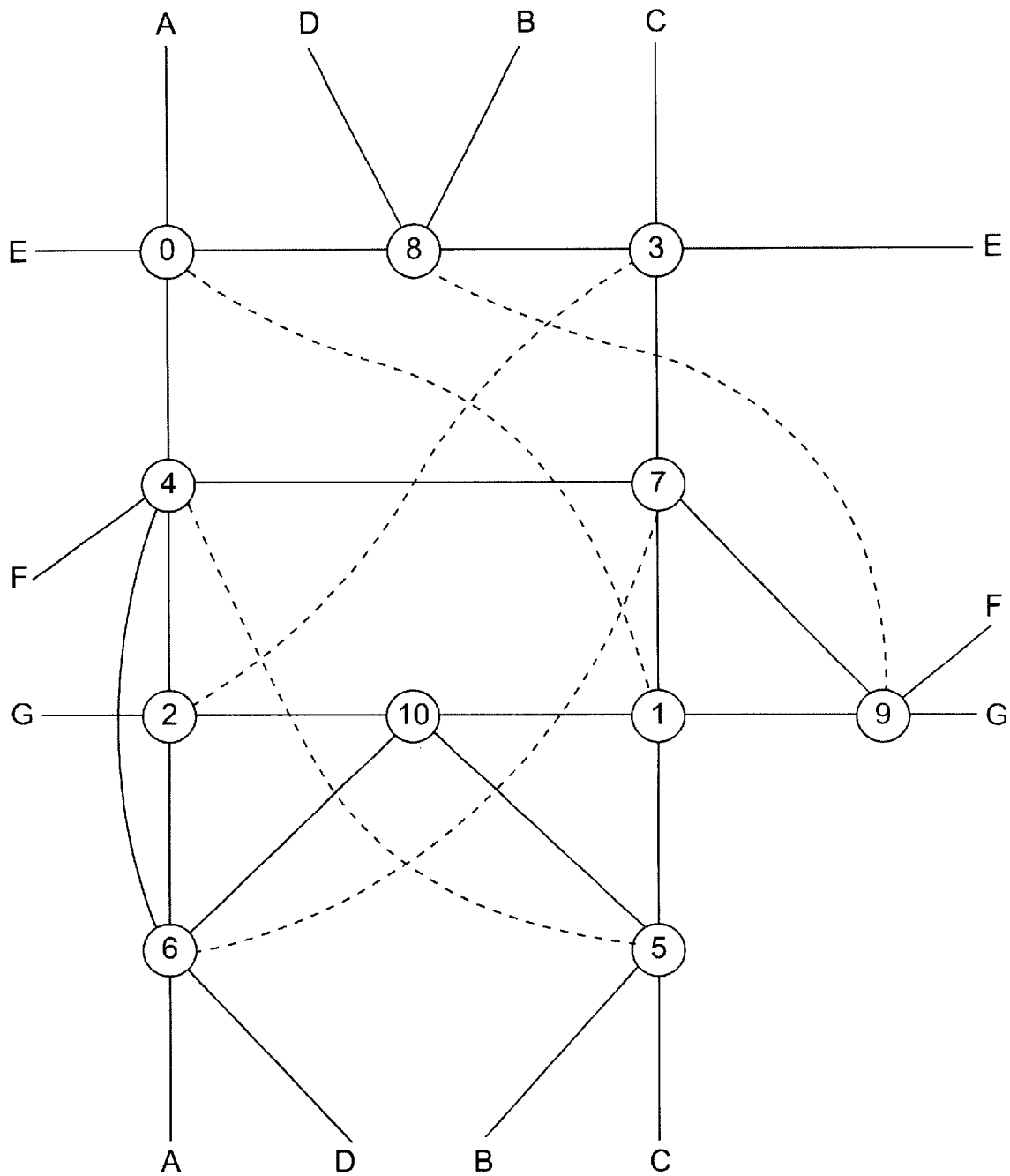
FIG. 9 depicts a network topology for a network of 11 nodes in accordance with methods and systems consistent with the present invention.

FIG. 9 depicts a network topology for a network of 11 nodes in accordance with methods and systems consistent with the present invention. As shown in FIG. 9, node 0 has a partner link with node 1 and directly connects to nodes 3, 4, 6, and 8. Node 1 has a partner link with node 0 and directly connects to nodes 5, 7, 9, and 10. Node 2 has a partner link with node 3 and directly connects to nodes 4, 6, 9, and 10. Node 3 has a partner link with node 2 and directly connects to nodes 0, 5, 7, and 8. Node 4 has a partner link with node 5 and directly connects to nodes 0, 2, 7, and 9. Node 5 has a partner link with node 4 and directly connects to nodes 1, 3, 8, and 10. Node 6 has a partner link with node 7 and directly connects to nodes 0, 2, 8, and 10. Node 7 has a partner link with node 6 and directly connects to nodes 1, 3, 4, and 9. Node 8 has a partner link with node 9 and directly connects to nodes 0, 3, 5, and 6. Node 9 has a partner link with node 8 and directly connects to nodes 1, 2, 4, and 7, and node 10 directly connects to nodes 1, 2, 5, and 6. A sample routing table fort this network is provided below.

| FROM\TO | 0 | 1 | 2 | 3 | 4 | 5 | 6 | 7 | 8 | 9 | 10 |
|---|---|---|---|---|---|---|---|---|---|---|---|
| 0 | | — | 3 | — | — | 4 | — | 6 | — | 8 | 6 |
| 1 | — | | 9 | 5 | 5 | — | 7 | — | 9 | — | — |
| 2 | 6 | 10 | | — | — | 4 | — | 6 | 9 | — | — |
| 3 | — | 0 | — | | — | 5 | — | 7 | — | — | 8 | 5 |
| 4 | — | 0 | — | 2 | | — | 7 | — | 9 | — | 2 |
| 5 | 1 | — | 3 | — | — | | 8 | 1 | — | 8 | — |
| 6 | — | 0 | — | 2 | 2 | 8 | | — | — | 8 | — |
| 7 | 1 | — | 3 | — | — | 4 | — | | 9 | — | 1 |
| 8 | — | 0 | 3 | — | 5 | — | 6 | — | | — | 6 |
| 9 | 1 | — | — | 2 | — | 4 | 7 | — | — | | 1 |
| 10 | 1 | — | — | 2 | 5 | — | — | 6 | 6 | 2 | |

Figure 10:
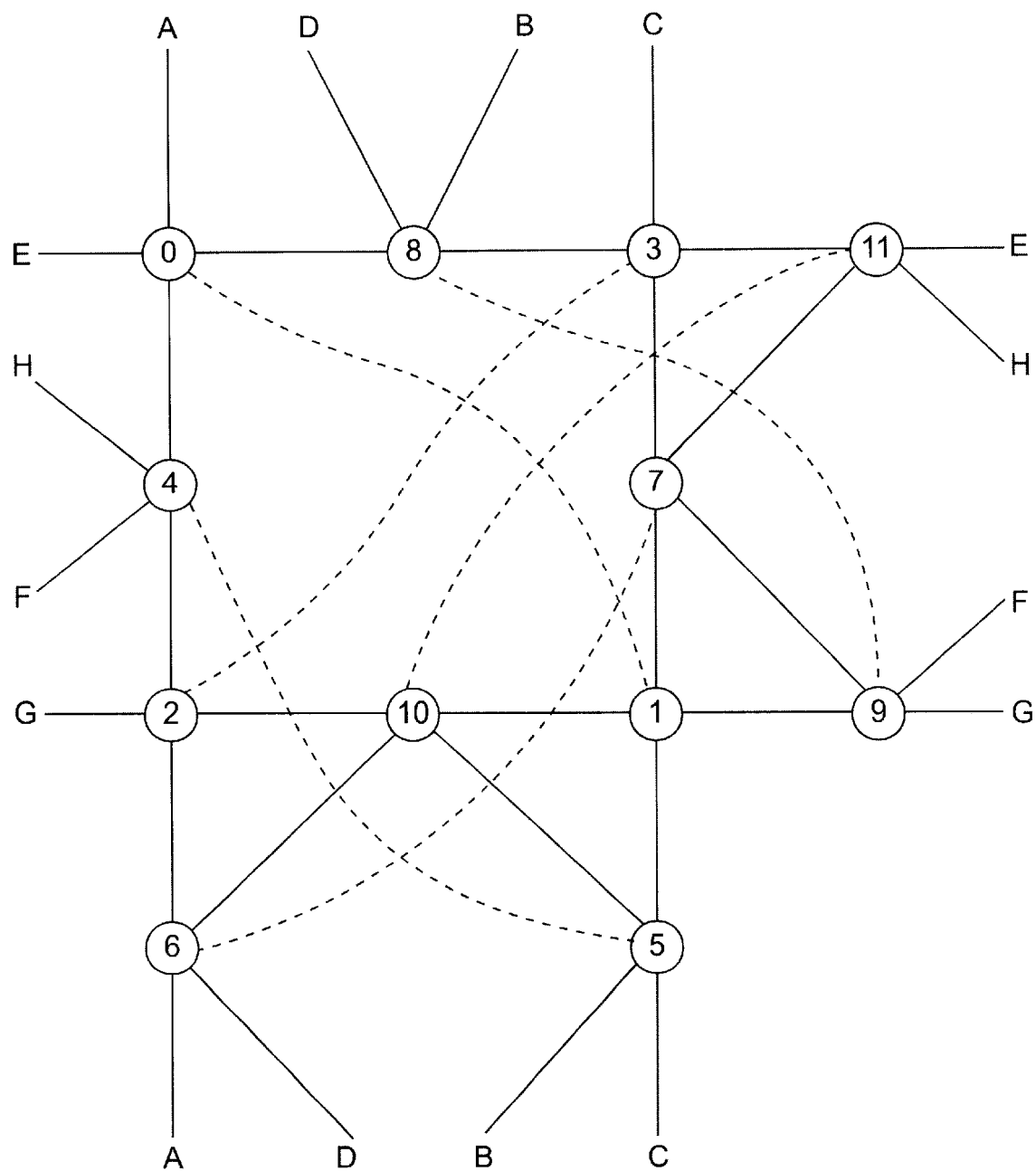
FIG. 10 depicts a network topology for a network of 12 nodes in accordance with methods and systems consistent with the present invention.

FIG. 10 depicts a network topology for a network of 12 nodes in accordance with methods and systems consistent with the present invention. As shown in FIG. 10, node 0 has a partner link with node 1 and directly connects to nodes 4, 6, 8, and 11. Node 1 has a partner link with node 0 and directly connects to nodes 5, 7, 9, and 10. Node 2 has a partner link with node 3 and directly connects to nodes 4, 6, 9, and 10. Node 3 has a partner link with node 2 and directly connects to nodes 5, 7, 8, and 11. Node 4 has a partner link with node 5 and directly connects to nodes 0, 2, 9, and 11. Node 5 has a partner link with node 4 and directly connects to nodes 1, 3, 8, and 10. Node 6 has a partner link with node 7 and directly connects to nodes 0, 2, 8, and 10. Node 7 has a partner link with node 6 and directly connects to nodes 0, 3, 9, and 11. Node 8 has a partner link with node 9 and directly connects to nodes 0, 3, 5, and 6. Node 9 has a partner link with node 8 and directly connects to nodes 1, 2, 4, and 7. Node 10 has a partner link with node 11 and directly connects to nodes 1, 2, 5, and 6, and node 11 has a partner link with node 10 and directly connects to nodes 0, 3, 4, and 7. An exemplary routing table is provided below.

| FROM\TO | 0 | 1 | 2 | 3 | 4 | 5 | 6 | 7 | 8 | 9 | 10 | 11 |
|---|---|---|---|---|---|---|---|---|---|---|---|---|
| 0 | | — | 4 | 8 | — | 4 | — | 6 | — | 8 | 11 | — |
| 1 | — | | 9 | 5 | 5 | — | 7 | — | 9 | — | — | 10 |
| 2 | 6 | 10 | | — | — | 4 | — | 6 | 9 | — | — | 10 |
| 3 | 11 | 7 | — | | — | 5 | — | 7 | — | — | 8 | 11 | — |
| 4 | — | 0 | — | 2 | | — | 0 | 9 | 9 | — | 11 | — |
| 5 | 1 | — | 3 | — | — | | 10 | 1 | — | 8 | — | 10 |
| 6 | — | 0 | — | 2 | 2 | 10 | | — | — | 8 | — | 10 |
| 7 | 1 | — | 3 | — | 9 | 3 | — | | 9 | — | 11 | — |
| 8 | — | 0 | 3 | — | 5 | — | 6 | — | | — | 5 | 0 |
| 9 | 1 | — | — | 2 | — | 4 | 7 | — | — | | 1 | 7 |
| 10 | 1 | — | — | 2 | 5 | — | — | 6 | 5 | 2 | | — |
| 11 | — | 0 | 3 | — | — | 4 | 7 | — | 3 | 7 | — | |

Figure 11:
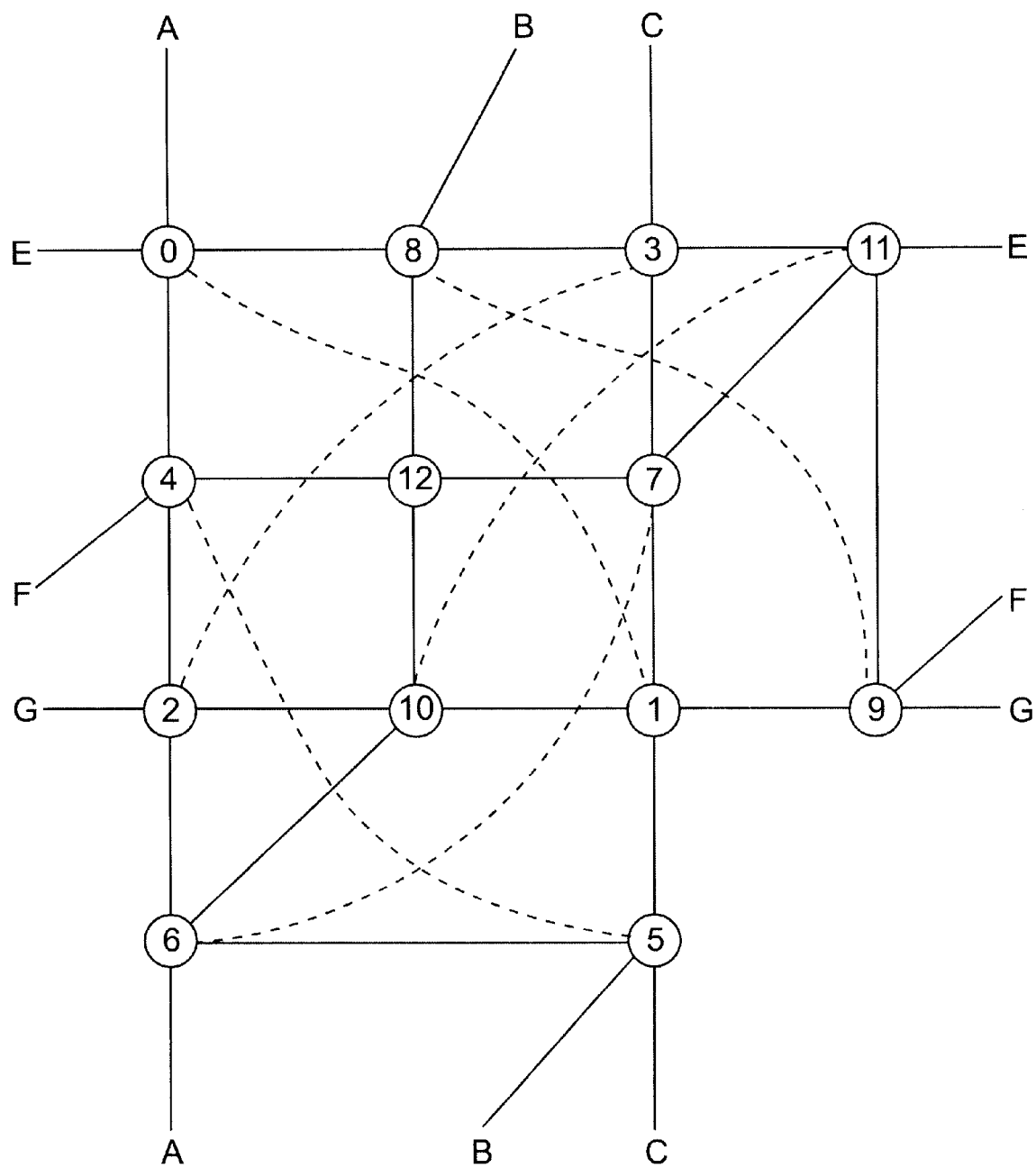
FIG. 11 depicts a network topology for a network of 13 nodes in accordance with methods and systems consistent with the present invention.

FIG. 11 depicts a network topology for a network of 13 nodes, in accordance with methods and system consistent with the present invention. As shown in FIG. 11, node 0 has a partner link with nodes 1 and directly connects to nodes 4, 6, 8, and 11. Node 1 has a partner link with node 0 and directly connects to nodes 5, 7, 9, and 10. Node 2 has a partner link with node 3 and directly connects to nodes 4, 6, 9, and 10. Node 3 has a partner link with node 2 and directly connects to nodes 5, 7, 8, and 11. Node 4 has a partner link with node 5 and directly connects to nodes 0, 2, 9, and 12. Node 5 has a partner link with n ode 4 and directly connects to nodes 1, 3, 6, and 8. Node 6 has a partner link with node 7 and directly connects to nodes 0, 2, 5, and 10. Node 7 has a partner link with node 6 and constantly connects to nodes 1, 3, 11, and 12. Node 8 has a partner link with node 9 and directly connects to nodes 0, 3, 5, and 12. Node 9 has a partner link with node 8 and directly connects to nodes 1, 2, 4, and 11. Node 10 has a partner link with node 11 and directly connects to nodes 1, 2, 6, and 12. Node 1 has a partner link with node 10 and directly connects to nodes 0, 3, 7, and 9, and 12 directly connects to nodes 4, 7, 8, and 10. An exemplary routing table for this network is provided below.

| FROM\TO | 0 | 1 | 2 | 3 | 4 | 5 | 6 | 7 | 8 | 9 | 10 | 11 | 12 |
|---|---|---|---|---|---|---|---|---|---|---|---|---|---|
| 0 | | — | 4 | 8 | — | 4 | — | 6 | — | 8 | 11 | — | 4 |
| 1 | — | | 9 | 5 | 5 | — | 7 | — | 9 | — | — | 10 | 7 |
| 2 | 6 | 10 | | — | — | 4 | — | 6 | 9 | — | — | 10 | 10 |
| 3 | 11 | 7 | — | | 5 | — | 7 | — | — | 8 | 11 | — | 7 |
| 4 | — | 0 | — | 2 | | — | 0 | 12 | 9 | — | 12 | 0 | — |
| 5 | 1 | — | 3 | — | — | | — | 6 | — | 8 | 1 | 3 | 8 |
| 6 | — | 0 | — | 2 | 5 | — | | — | 0 | 2 | — | 10 | 10 |
| 7 | 1 | — | 3 | — | 12 | 3 | — | | 3 | 11 | 11 | — | — |
| 8 | — | 0 | 3 | — | 5 | — | 0 | 12 | | — | 12 | 0 | — |
| 9 | 1 | — | — | 2 | — | 4 | 2 | 1 | — | | 11 | — | 4 |
| 10 | 1 | — | — | 2 | 2 | 6 | — | 6 | 12 | 2 | | — | — |

-continued

| FROM\TO | 0 | 1 | 2 | 3 | 4 | 5 | 6 | 7 | 8 | 9 | 10 | 11 | 12 |
|---|---|---|---|---|---|---|---|---|---|---|---|---|---|
| 11 | — | 0 | 3 | — | 0 | 3 | 7 | — | 9 | — | — | | 7 |
| 12 | 8 | 10 | 4 | 8 | — | 4 | 7 | — | — | 8 | — | 10 | |

Figure 12:
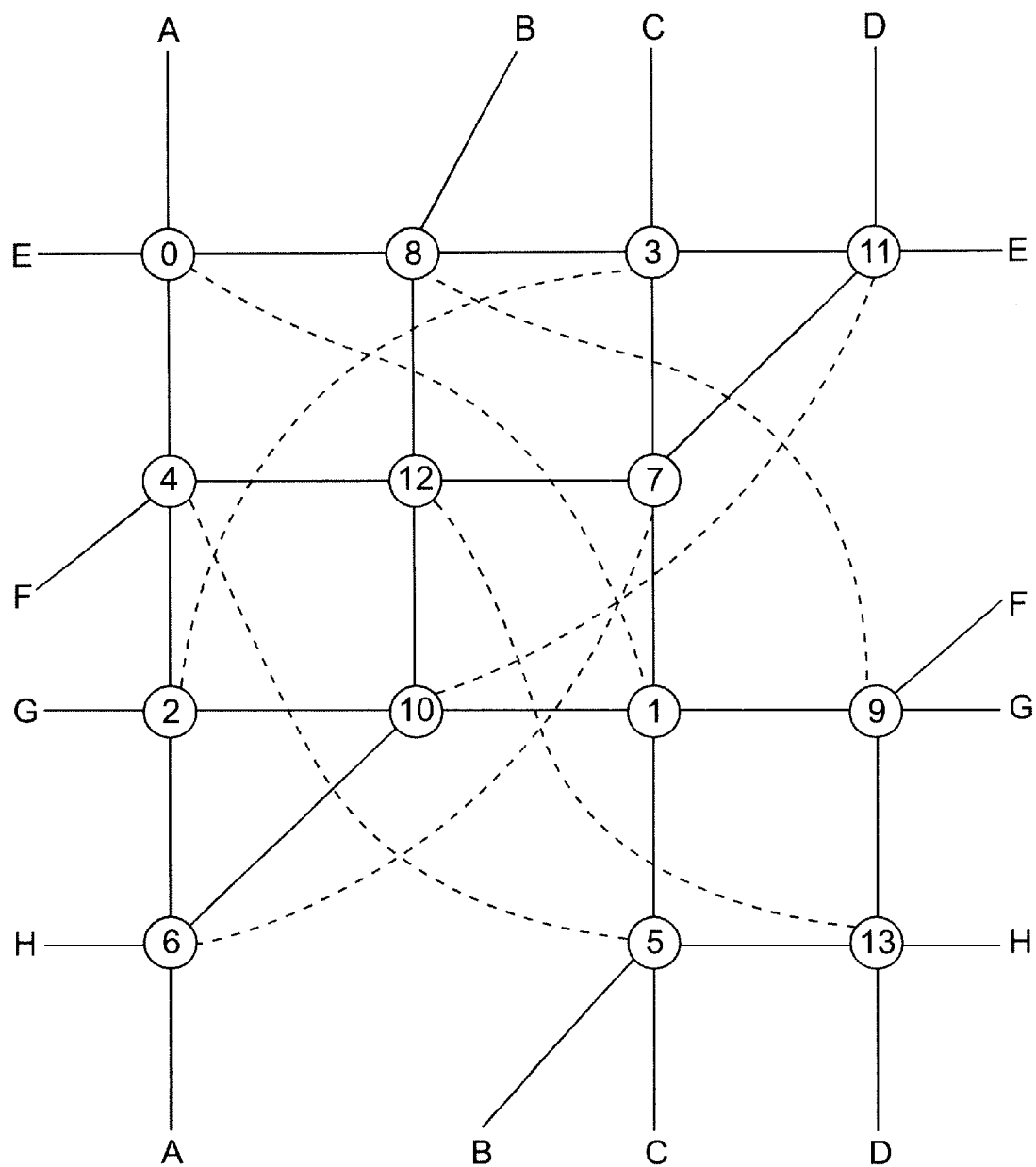
FIG. 12 depicts a network topology for a network of 14 nodes in accordance with methods and systems consistent with the present invention.
Figure 13:
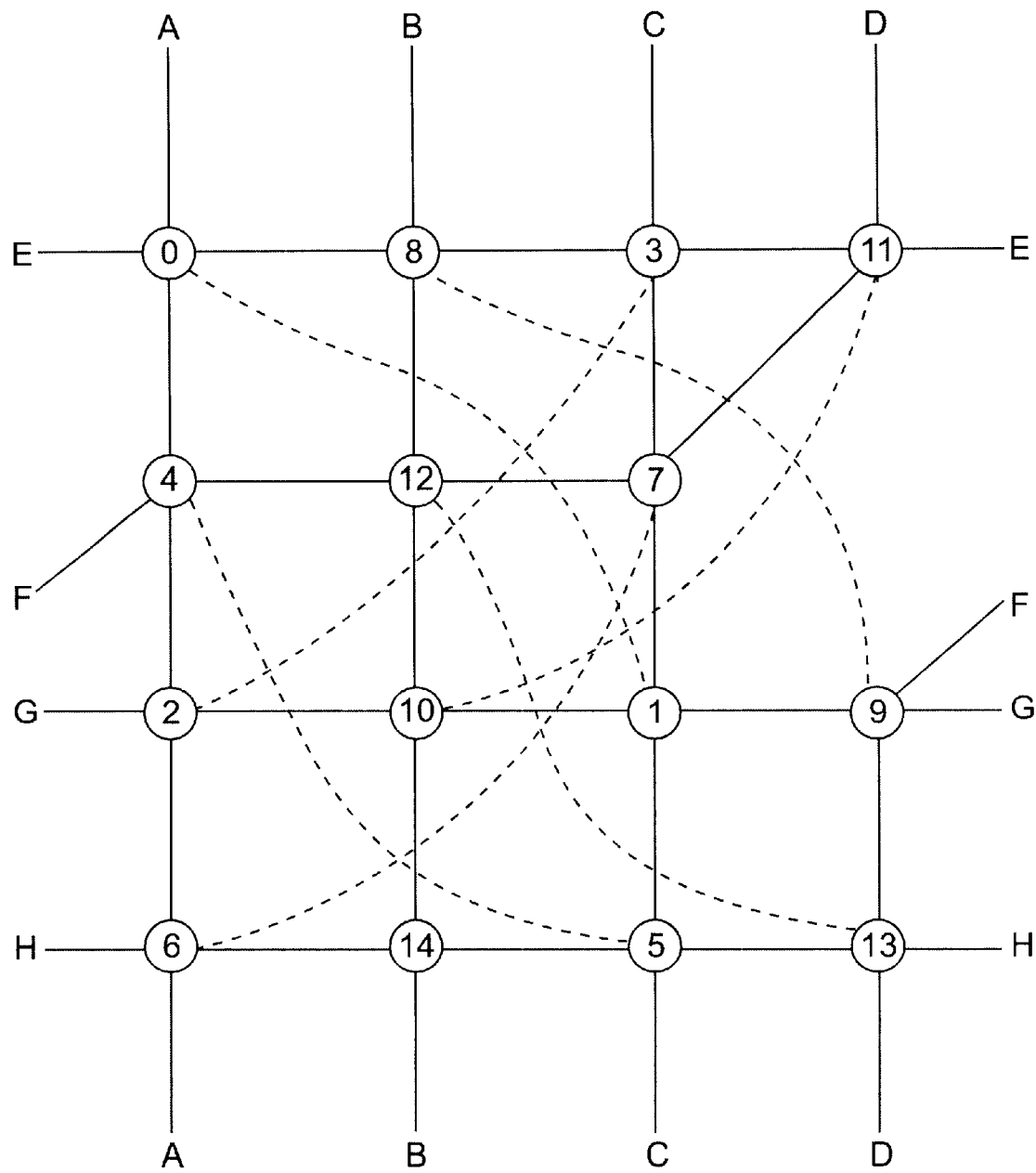
FIG. 13 depicts a network topology for a network of 15 nodes in accordance with methods and systems consistent with the present invention.

FIG. 12 depicts a network topology for a network of 14 nodes in accordance with methods and systems consistent with the present invention. As shown in FIG. 12, node 0 has a partner link with node 1 and directly connects to nodes 4, 6, 8, and 11. Node 1 has a partner link with node 0 and directly connects to nodes 5, 7, 9, and 10. Node 2 has a partner link with node 3 and directly connects to nodes 4, 6, 9, and 10. Node 3 has a partner link with node 2 and directly connects to nodes 5, 7, 8, and 11. Node 4 has a partner link with node 5 and directly connects to nodes 0, 2, 9, and 12. Node 5 has a partner link with node 4 and directly connects to nodes 1, 3, 8, and 13. Node 6 has a partner link with node 7 and directly connects to nodes 0, 2, 10, and 13. Node 7 has a partner link with node 6 and directly connects to nodes 1, 3, 11 and 12. Node 8 has a partner link with node 9 and directly connects to nodes 0, 3, 5, and 12. Node 9 has a partner link with node 8 and directly connects to nodes 1, 2, 4, and 13. Node 10 has a partner link with node 11 and directly connects to nodes 1, 2, 6, and 12. Node 11 has a partner link with node 10 and directly connects to nodes 0, 3, 7, and 13. Node 12 has a partner link with node 13 and directly connects to nodes 4, 7, 8, and 10, and node 13 has a partner link with node 12 and directly connects to nodes 5, 6, 9, and 11. An exemplary routing table for this network is provided below.

with the present invention. As shown in FIG. 13, node 0 has a partner link with node 1 and directly connects to nodes 4, 6, 8 and 11. Node 1 has a partner link with node 0 and directly connects to nodes 5, 7, 9, and 10. Node 2 has a partner link with node 3 and directly connects to nodes 4, 6, 9, and 10. Node 3 has, a partner link with node 2 and directly connects to nodes 5, 7, 8, and 11. Node 4 has a partner link with node 5 and directly connects to nodes 0, 2, 9, and 12. Nodes 5 has a partner link with node 4 and directly connects to nodes 1, 3, 13, and 14. Node 6 has a partner link with node 7 and directly connects to nodes 0, 2, 13, and 14. Node 7 has a partner link with node 6 and directly connects to nodes 1, 3, 11, and 12. Node 8 has a partner link with node 9 and directly connects to nodes 0, 3, 12, and 14. Node 9 has a partner link with node 8 and directly connects to nodes 1, 2, 4, and 13. Node 10 has a partner link with node 11 and directly connects to nodes 1, 2, 12, and 14. Node 11 has a partner link with node 10 and directly connects to nodes 0, 3, 7, and 13. Node 12 has a partner link with node 13 and directly connects to nodes 4, 7, 8, and 0. Node 13 has a partner link with node 12 and directly connects to nodes 5, 6, 9, and 11, and node 14 directly connects to nodes 5, 6, 8,

| FROM\TO | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | — | 4 | 8 | — | 4 | — | 6 | — | 8 | 11 | — | 8 | 6 |
| 1 | — | | 9 | 5 | 5 | — | 7 | — | 9 | — | — | 10 | 7 | 5 |
| 2 | 6 | 10 | | — | — | 4 | — | 6 | 9 | — | — | 10 | 10 | 6 |
| 3 | 11 | 7 | — | | 5 | — | 7 | — | — | 8 | 11 | — | 7 | 11 |
| 4 | — | 0 | — | 2 | | — | 0 | 12 | 9 | — | 12 | 0 | — | 12 |
| 5 | 1 | — | 3 | — | — | | 13 | 1 | — | 8 | 1 | 13 | 13 | — |
| 6 | — | 0 | — | 2 | 2 | 13 | | — | 0 | 2 | — | 10 | 13 | — |
| 7 | 1 | — | 3 | — | 12 | 3 | — | | 3 | 1 | 11 | — | — | 12 |
| 8 | — | 0 | 3 | — | 5 | — | 0 | 12 | | — | 12 | 0 | — | 12 |
| 9 | 1 | — | — | 2 | — | 4 | 13 | 1 | — | | 1 | 13 | 13 | — |
| 10 | 1 | — | — | 2 | 2 | 1 | — | 6 | 12 | 2 | | — | — | 12 |
| 11 | — | 0 | 3 | — | 0 | 3 | 7 | — | 3 | 13 | — | | 13 | — |
| 12 | 8 | 10 | 4 | 8 | — | 4 | 7 | — | — | 8 | — | 10 | | — |
| 13 | 11 | 9 | 9 | 5 | 5 | — | — | 6 | 9 | — | 11 | — | — | |

FIG. 13 depicts a network topology for a network of 15 nodes in accordance with methods and system consistent and 10. An example routing table for this network is provided below.

| FROM\TO | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0 | | — | 4 | 8 | — | 4 | — | 6 | — | 8 | 11 | — | 4 | 6 | 8 |
| 1 | — | | 9 | 5 | 5 | — | 7 | — | 9 | — | — | 10 | 7 | 5 | 5 |
| 2 | 6 | 10 | | — | — | 4 | — | 6 | 9 | — | — | 10 | 10 | 6 | 6 |
| 3 | 11 | 7 | — | | 5 | — | 7 | — | — | 8 | 11 | — | 7 | 11 | 5 |
| 4 | — | 0 | — | 2 | | — | 0 | 12 | 9 | — | 12 | 0 | — | 12 | 5 |
| 5 | 1 | — | 3 | — | — | | 13 | 1 | 3 | 1 | 1 | 13 | 13 | — | — |
| 6 | — | 0 | — | 2 | 2 | 14 | | — | 14 | 2 | 2 | 0 | 13 | — | — |
| 7 | 1 | — | 3 | — | 12 | 3 | — | | 3 | 1 | 11 | — | — | 12 | 6 |
| 8 | — | 0 | 3 | — | 12 | 14 | 0 | 12 | | — | 12 | 0 | — | 12 | — |
| 9 | 1 | — | — | 2 | — | 4 | 13 | 1 | — | | 1 | 13 | 13 | — | 8 |

-continued

| FROM\TO | 0  | 1  | 2  | 3 | 4 | 5  | 6 | 7  | 8  | 9 | 10 | 11 | 12 | 13 | 14 |
|---------|----|----|----|---|---|----|---|----|----|---|----|----|----|----|----|
| 10      | 1  | —  | —  | 2 | 2 | 14 | 2 | 12 | 14 | 2 | —  | —  | —  | 12 | —  |
| 11      | —  | 0  | 3  | — | 0 | 3  | 7 | —  | 3  | 13| —  |    | 13 | —  | 10 |
| 12      | 8  | 10 | 4  | 8 | — | 4  | 7 | —  | —  | 8 | —  | 10 |    | —  | 8  |
| 13      | 11 | 9  | 9  | 5 | 5 | —  | — | 6  | 9  | — | 11 | —  | —  |    | 5  |
| 14      | 6  | 10 | 10 | 8 | 5 | —  | — | 6  | —  | 8 | —  | 10 | 10 | 6  |    |

Figure 14:
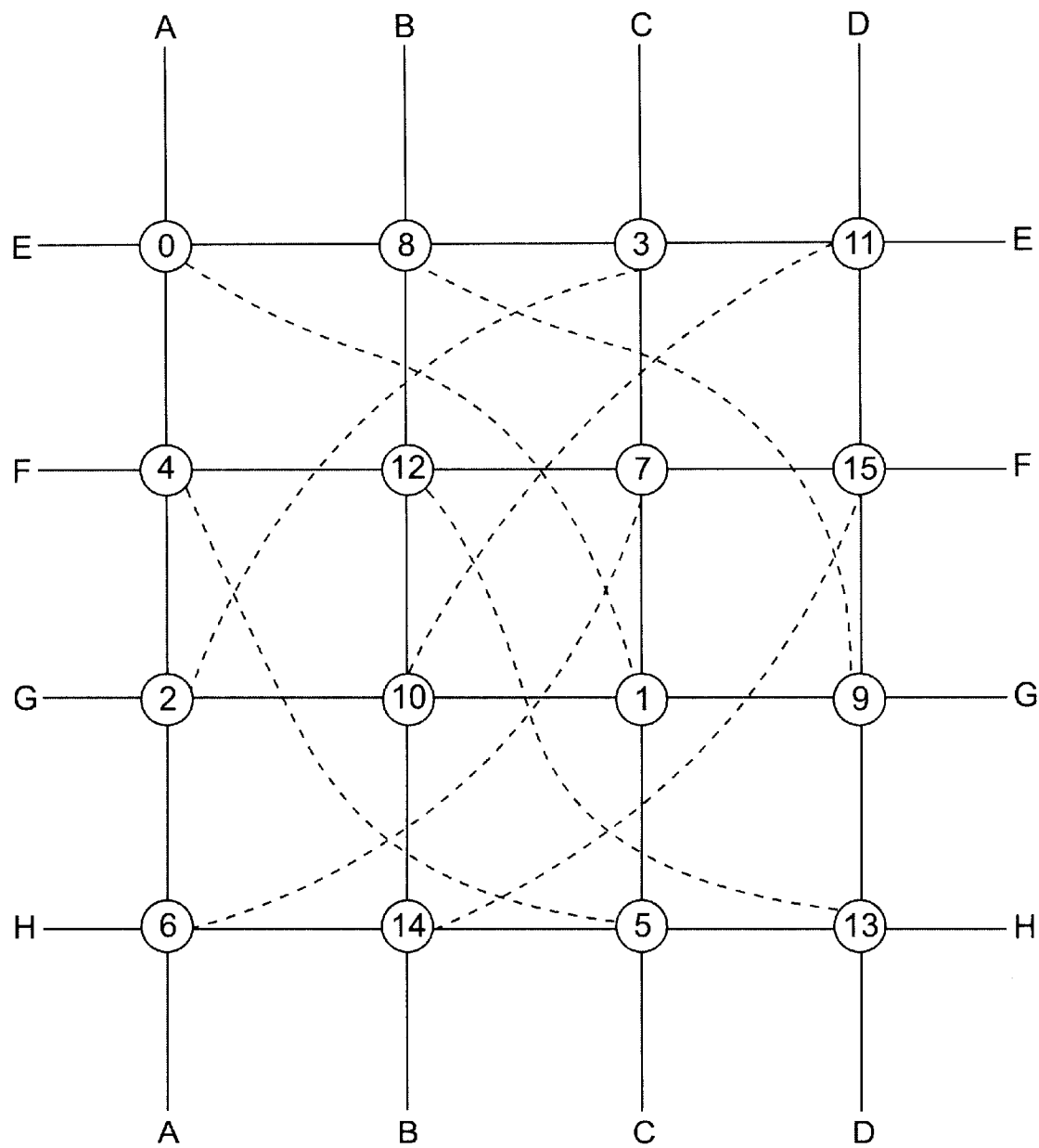
FIG. 14 depicts a network topology for a network of 16 nodes in accordance with methods and systems consistent with the present invention.

FIG. 14 depicts a network topology for a network of 16 nodes in accordance with methods and systems consistent with the present invention. As shown in this figure, node 0 has a partner link with node 1 and directly connects to nodes 4, 6, 8, and 11. Node 1 has a partner link with node 0 and directly connects to nodes 5, 7, 9, and 10. Node 2 has a partner link with node 3 and directly connects to nodes 4, 6, 9, and 10. Node 3 has a partner link with node 2 and directly connects to nodes 5, 7, 8, and 11. Node 4 has a partner link with node 5 and directly connects to nodes 0, 2, 12, and 15. Node 5 has a partner link with node 4 and directly connects to nodes 1, 3, 13, and 14. Node 6 has a partner link with node 7 and directly connects to nodes 0, 2, 13, and 14. Node 7 has a partner link with node 6 and directly connects to nodes 1, 3, 12, and 15. Node 8 has a partner link with node 9 and directly connects to nodes 0, 3, 12, and 14. Node 9 has a partner link with node 8 and directly connects to nodes 1, 2, 13, and 15. Node 10 has a partner link with node 11 and directly connects to nodes 1, 2, 12, and 14. Node 11 has a partner link with node 10 and directly connects to nodes 0, 3, 13, and 15. Node 12 has a partner link with node 13 and directly connects to nodes 4, 7, 8, and 10. Node 13 has a partner link with node 12 and directly connects to nodes 5, 6, 9, and 11. Node 14 has a partner link with node 15 and directly connects to nodes 5, 6, 8, and 10, and node 15 has a partner link with node 14 and directly connects to nodes 4, 7, 9, and 11. An exemplary routing table for this network topology is provided below.

an environment where each node has 5 ports while also attempting to maximize port usage. Additionally, when reconfiguring a network in accordance with methods and systems consistent with the present invention, the reconfiguration occurs without bringing down the network. Instead, the network remains operational during the reconfiguration; with only a minimal interruption.

Figure 15:
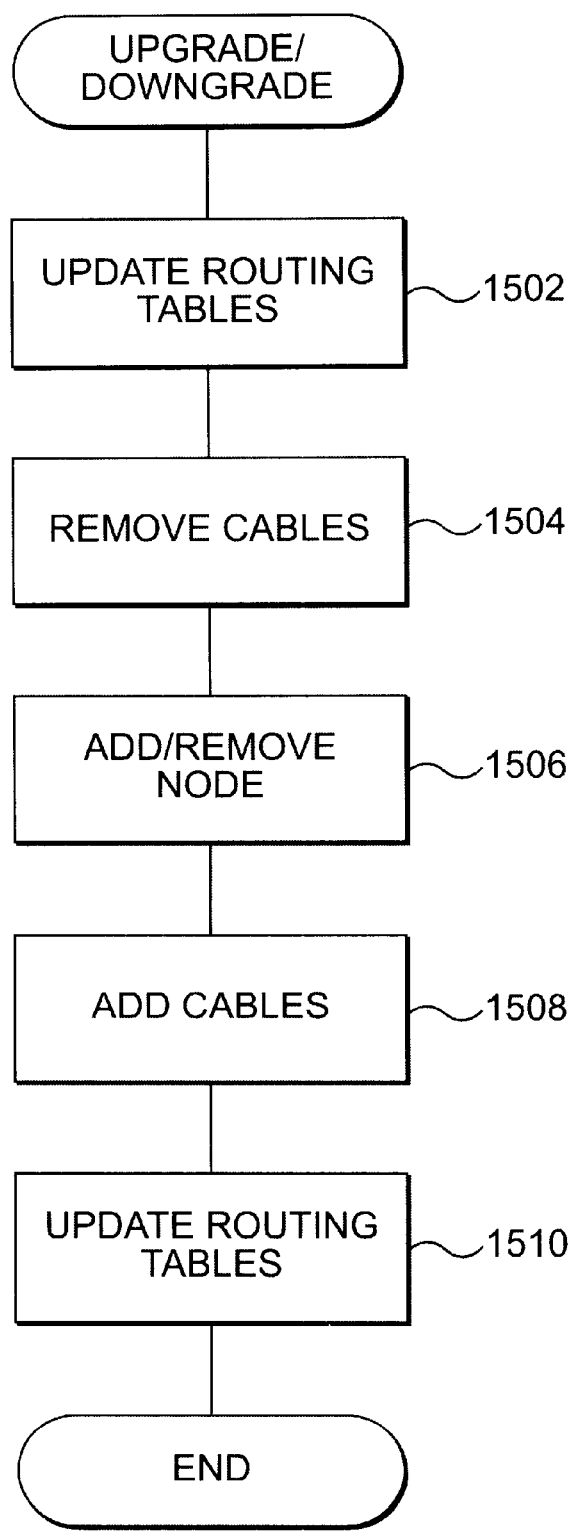
FIG. 15 depicts a flowchart of the steps performed when reconfiguring one of the networks depicted in FIGS. 5–14.

FIG. 15 depicts a flowchart of the steps performed when reconfiguring one of the network topologies in accordance with methods and systems consistent with the present invention. When performing an upgrade or downgrade, the administrator, from an administrator's console (e.g., one of the nodes), sends to the routing software on all of the nodes a signal, including an interim routing table for use in routing traffic around the part of the network affected by the upgrade or downgrade (step 1502). The interim routing tables for each network topology are provided below. While the routing tables are updated, network traffic is stalled for a small amount of time, on the order of milliseconds. During this time, the nodes buffer network traffic, so no data loss occurs.

After updating the routing tables, the network administrator removes the cables from the affected area of the network (step 1504). The particular cables removed for each network topology are described below. Next, the network administrator adds or removes the appropriate node (step 1506), adds the appropriate cables (step 1508), and then sends new routing tables to each of the nodes of the network that either utilize the new node or avoid the removed node

| FROM\TO | 0  | 1  | 2  | 3  | 4  | 5  | 6  | 7  | 8  | 9  | 10 | 11 | 12 | 13 | 14 | 15 |
|---------|----|----|----|----|----|----|----|----|----|----|----|----|----|----|----|----|
| 0       |    | —  | 4  | 8  | —  | 4  | —  | 6  | —  | 8  | 11 | —  | 4  | 6  | 8  | 4  |
| 1       | —  |    | 9  | 5  | 5  | —  | 7  | —  | 9  | —  | —  | 10 | 7  | 5  | 5  | 9  |
| 2       | 6  | 10 |    | —  | —  | 4  | —  | 6  | 9  | —  | —  | 10 | 10 | 6  | 6  | 4  |
| 3       | 11 | 7  | —  |    | 5  | —  | 7  | —  | —  | 8  | 11 | —  | 7  | 11 | 5  | 7  |
| 4       | —  | 0  | —  | 2  |    | —  | 0  | 12 | 0  | 2  | 12 | 0  | —  | 12 | 15 | —  |
| 5       | 1  | —  | 3  | —  | —  |    | 13 | 1  | 3  | 1  | 1  | 13 | 13 | —  | —  | 14 |
| 6       | —  | 0  | —  | 2  | 2  | 14 |    | —  | 14 | 2  | 2  | 0  | 13 | —  | —  | 14 |
| 7       | 1  | —  | 3  | —  | 15 | 3  | —  |    | 3  | 15 | 1  | 3  | —  | 12 | 15 | —  |
| 8       | —  | 0  | 3  | —  | 12 | 14 | 0  | 12 |    | —  | 12 | 0  | —  | 12 | —  | 14 |
| 9       | 1  | —  | —  | 2  | 15 | 13 | 13 | 1  | —  |    | 1  | 13 | 13 | —  | 15 | —  |
| 10      | 1  | —  | —  | 2  | 2  | 14 | 14 | 12 | 14 | 2  |    | —  | —  | 12 | —  | 14 |
| 11      | —  | 0  | 3  | —  | 15 | 3  | 13 | 15 | 3  | 15 | —  |    | 13 | —  | 15 | —  |
| 12      | 8  | 10 | 4  | 8  | —  | 4  | 7  | —  | —  | 8  | —  | 10 |    | —  | 8  | 4  |
| 13      | 11 | 9  | 9  | 5  | 5  | —  | —  | 6  | 9  | —  | 11 | —  | —  |    | 5  | 9  |
| 14      | 6  | 10 | 10 | 8  | 5  | —  | —  | 6  | —  | 8  | —  | 10 | 10 | 6  |    | —  |
| 15      | 11 | 7  | 9  | 11 | —  | 4  | 7  | —  | 9  | —  | 11 | —  | 7  | 11 | —  |    |

Upgrade/Downgrade of Network Topologies

The above-described network topologies have been selected to simplify the reconfiguration of the network. As described below, for many of the network topologies, reconfiguring the network to either add or remove a node requires the minimal amount of recabling necessary. For example, to add a node to the seven-node network topology, two links are removed and five links (including one partner link) are added to connect the eighth node. This is the minimal amount of recabling that can be done when adding a node in (step 1510). While updating the routing tables, network traffic stalls momentarily while the new routing tables replace the interim routing tables, and then network traffic resumes using these tables. By reconfiguring the network in this manner, the network is twice interrupted for very short periods of time and remains effectively operational, thus providing a virtually hot upgrade or downgrade.

Described below are the upgrade sequences for adding a node to a network of between 6–15 nodes. One skilled in the art will appreciate that downgrading occurs by reversing the upgrade sequences.

Upgrading from 6 Nodes to 7 Nodes

When upgrading from 6 nodes to 7 nodes, the network administrator utilizes the interim routing table provided below, removes links 2-0 and 4-3, and then adds links 6-0, 6-2, 6-3, and 6-4. After adding these links, the network administrator utilizes the routing table (described above) for a network of 7 nodes.

| FROM\TO | 0 | 1 | 2 | 3 | 4 | 5 |
|---|---|---|---|---|---|---|
| 0 | — | — | 3 | — | — | — |
| 1 | — | — | — | — | — | — |
| 2 | 1 | — | — | — | — | — |
| 3 | — | — | — | — | 5 | — |
| 4 | — | — | — | 2 | — | — |
| 5 | — | — | — | — | — | — |

Upgrading from 7 Nodes to 8 Nodes

When upgrading from 7 nodes to 8 nodes, the network administrator utilizes the interim routing table provided below, removes links 3-1 and 5-2, and then adds links 7-1, 7-2, 7-3, 7-5, and 7-6. After adding these links, the network administrator utilizes the routing table (described above) for a network of 8 nodes.

| FROM\TO | 0 | 1 | 2 | 3 | 4 | 5 | 6 |
|---|---|---|---|---|---|---|---|
| 0 | — | — | 3 | — | — | — | — |
| 1 | — | — | — | 2 | — | — | 4 |
| 2 | 1 | — | — | — | — | 4 | — |
| 3 | — | 0 | — | — | 5 | — | — |
| 4 | — | — | — | 2 | — | — | — |
| 5 | — | — | 3 | — | — | — | 3 |
| 6 | — | 0 | — | — | — | 4 | — |

Upgrading from 8 Nodes to 9 Nodes

To perform this upgrade, the network administrator utilizes the interim routing table provided below, remove links 5-0 and 6-3, adds links 8-0, 8-3, 8-5, and 8-6, and then utilizes the routing table described above for a network of 9 nodes.

| FROM\TO | 0 | 1 | 2 | 3 | 4 | 5 | 6 | 7 |
|---|---|---|---|---|---|---|---|---|
| 0 | — | — | 3 | — | — | 4 | — | 6 |
| 1 | — | — | — | 2 | — | — | 7 | — |
| 2 | 1 | — | — | — | — | 4 | — | — |
| 3 | — | 0 | — | — | 5 | — | 7 | — |
| 4 | — | — | — | 2 | — | — | — | 6 |
| 5 | 1 | — | 3 | — | — | — | 7 | — |
| 6 | — | 0 | — | 2 | — | 4 | — | — |
| 7 | 1 | — | — | — | 5 | — | — | — |

Upgrading from 9 Nodes to 10 Nodes

To perform this upgrade, the network administrator utilizes the interim routing table provided below, removes links 4-1 and 7-2, adds links 9-1, 9-2, 9-4, 9-7, and 9-8, and then utilizes the routing table described above for a network of 10 nodes.

| FROM\TO | 0 | 1 | 2 | 3 | 4 | 5 | 6 | 7 | 8 |
|---|---|---|---|---|---|---|---|---|---|
| 0 | — | — | 3 | — | — | 4 | — | 6 | — |
| 1 | — | — | — | 2 | 5 | — | 7 | — | 5 |
| 2 | 1 | — | — | — | — | 4 | — | 6 | 6 |
| 3 | — | 0 | — | — | 5 | — | 7 | — | — |
| 4 | — | 0 | — | 2 | — | — | — | 6 | 0 |
| 5 | 1 | — | 3 | — | — | — | 7 | — | — |
| 6 | — | 0 | — | 2 | — | 4 | — | — | — |
| 7 | 1 | — | 3 | — | 5 | — | — | — | 3 |
| 8 | — | 0 | 3 | — | 5 | — | — | 6 | — |

Upgrading from 10 Nodes to 11 Nodes

To upgrade from 10 nodes to 11 nodes, the network administrator utilizes the interim routing table provided below, removes links 2-1, 6-4, and 7-5, adds links 10-1, 10-2, 7-4, 10-5, and 10-6, and then utilizes the routing table described above for a network of 11 nodes.

| FROM\TO | 0 | 1 | 2 | 3 | 4 | 5 | 6 | 7 | 8 | 9 |
|---|---|---|---|---|---|---|---|---|---|---|
| 0 | — | — | 3 | — | — | 4 | — | 6 | — | 8 |
| 1 | — | — | 9 | 5 | 5 | — | 7 | — | 9 | — |
| 2 | 6 | 9 | — | — | — | 4 | — | 6 | 9 | — |
| 3 | — | 0 | — | — | 5 | — | 7 | — | — | 8 |
| 4 | — | 0 | — | 2 | — | — | 0 | 9 | 9 | — |
| 5 | 1 | — | 3 | — | — | — | 8 | 1 | — | 8 |
| 6 | — | 0 | — | 2 | 2 | 8 | — | — | — | 8 |
| 7 | 1 | — | 3 | — | 9 | 3 | — | — | 9 | — |
| 8 | — | 0 | 3 | — | 5 | — | — | 6 | — | — |
| 9 | 1 | — | — | 2 | — | 4 | 7 | — | — | — |

Upgrading from 11 Nodes to 12 Nodes

To upgrade from 11 nodes to 12 nodes, the network administrator utilizes the interim routing table provided below, removes links 3-0 and 7-4, adds links 11-0, 11-3, 11-4, 11-7, and then utilizes the routing table described above for a network of 12 nodes.

| FROM\TO | 0 | 1 | 2 | 3 | 4 | 5 | 6 | 7 | 8 | 9 | 10 |
|---|---|---|---|---|---|---|---|---|---|---|---|
| 0 | — | — | 4 | 8 | — | 4 | — | 6 | — | 8 | 6 |
| 1 | — | — | 9 | 5 | 5 | — | 7 | — | 9 | — | — |
| 2 | 6 | 10 | — | — | — | 4 | — | 6 | 9 | — | — |
| 3 | 8 | 7 | — | — | 5 | — | 7 | — | — | 8 | 5 |
| 4 | — | 0 | — | 2 | — | — | 0 | 9 | 9 | — | 2 |
| 5 | 1 | — | 3 | — | — | — | 8 | 1 | — | 8 | — |
| 6 | — | 0 | — | 2 | 2 | 8 | — | — | — | 8 | — |
| 7 | 1 | — | 3 | — | 9 | 3 | — | — | 9 | — | 1 |
| 8 | — | 0 | 3 | — | 5 | — | — | 6 | — | — | 6 |
| 9 | 1 | — | — | 2 | — | 4 | 7 | — | — | — | 1 |
| 10 | 1 | — | — | 2 | 5 | — | — | 6 | 6 | 2 | — |

Upgrading from 12 Nodes to 13 Nodes

To perform this upgrade, the network administrator utilizes the interim routing table provided below, removes links 11-4, 10-5, 8-6, and 9-7, adds links 12-4, 9-5, 11-6, 12-7, 12-8, and 12-10, and then utilizes the routing table described above for a network of 13 nodes. The entry at the intersection of row 4 and column 7, for example, indicates that data from node 4 is sent to node 7 by way of nodes 0 and 6. That is, a path of length 3 is used. Paths of length 3 are needed only during the upgrade/downgrade procedure.

| FROM\TO | 0 | 1 | 2 | 3 | 4 | 5 | 6 | 7 | 8 | 9 | 10 | 11 |
|---|---|---|---|---|---|---|---|---|---|---|---|---|
| 0 |  | — | 4 | 8 | — | 4 | — | 6 | — | 8 | 11 | — |
| 1 | — |  | 9 | 5 | 5 | — | 7 | — | 9 | — | — | 10 |
| 2 | 4 | 10 |  | — | — | 4 | — | 6 | 9 | — | — | 10 |
| 3 | 8 | 7 | — |  | 5 | — | 7 | — | — | 8 | 11 | — |
| 4 | — | 0 | — | 2 |  | — | 0 | 0, 6 | 9 | — | 2 | 0 |
| 5 | 1 | — | 3 | — | — |  | 1, 7 | 1 | — | 8 | 1 | 3 |
| 6 | — | 0 | — | 2 | 2 | 2, 4 |  | — | 0 | 2 | — | 10 |
| 7 | 1 | — | 3 | — | 3, 5 | 3 | — |  | — | 3 | 1 | 11 |
| 8 | — | 0 | 3 | — | 5 | — | 0 | 3 |  | — | 0, 11 | 0 |
| 9 | 1 | — | — | 2 | — | 4 | 2 | 1 | — |  | 1 | 1, 10 |
| 10 | 1 | — | — | 2 | 2 | 1 | — | 6 | 2, 9 | 2 |  | — |
| 11 | — | 0 | 3 | — | 0 | 3 | 7 | — | 3 | 3, 8 | — |  |

Upgrading from 13 Nodes to 14 Nodes

To perform this upgrade, the network administrator utilizes the interim routing table provided below, removes links 9-5 and 11-6, adds links 13-5, 13-6, 13-9, 13-11, and 13-12, and then utilizes the routing table described above for a network of 14 nodes.

Upgrading from 15 Nodes to 16 Nodes

When upgrading from 15 nodes to 16 nodes, the network administrator utilizes the interim routing table provided below, removes links 9-4 and 11-7, adds links 15-4, 15-7, 15-9, 15-11, and 15-14, and then utilizes the routing table described above for a network of 16 nodes.

| FROM\TO | 0 | 1 | 2 | 3 | 4 | 5 | 6 | 7 | 8 | 9 | 10 | 11 | 12 |
|---|---|---|---|---|---|---|---|---|---|---|---|---|---|
| 0 |  | — | 4 | 8 | — | 4 | — | 6 | — | 8 | 11 | — | 4 |
| 1 | — |  | 9 | 5 | 5 | — | 7 | — | 9 | — | — | 10 | 7 |
| 2 | 6 | 10 |  | — | — | 4 | — | 6 | 9 | — | — | 10 | 10 |
| 3 | 8 | 7 | — |  | 5 | — | 7 | — | — | 8 | 11 | — | 7 |
| 4 | — | 0 | — | 2 |  | — | 0 | 12 | 9 | — | 12 | 0 | — |
| 5 | 1 | — | 3 | — | — |  | 1, 7 | 1 | — | 8 | 1 | 3 | 8 |
| 6 | — | 0 | — | 2 | 2 | 2, 4 |  | — | 0 | 2 | — | 10 | 10 |
| 7 | 1 | — | 3 | — | 12 | 3 | — |  | 3 | 1 | 11 | — | — |
| 8 | — | 0 | 3 | — | 5 | — | 0 | 12 |  | — | 12 | 0 | — |
| 9 | 1 | — | — | 2 | — | 4 | 2 | 1 | — |  | 1 | 1, 10 | 4 |
| 10 | 1 | — | — | 2 | 2 | 1 | — | 6 | 12 | 2 |  | — | — |
| 11 | — | 0 | 3 | — | 0 | 3 | 7 | — | 3 | 3, 8 | — |  | 7 |
| 12 | 8 | 10 | 4 | 8 | — | 4 | 7 | — | — | 8 | — | 10 |  |

Upgrading from 14 Nodes to 15 Nodes

To perform this upgrade, the network administrator utilizes the interim routing table provided below, removes links 8-5 and 10-6, adds links 14-5, 14-6, 14-8, and 14-10, and then utilizes the routing table described above for a network of 15 nodes.

| FROM\TO | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 |  | — | 4 | 8 | — | 4 | — | 6 | — | 8 | 11 | — | 4 | 6 |
| 1 | — |  | 9 | 5 | 5 | — | 7 | — | 9 | — | — | 10 | 7 | 9 |
| 2 | 6 | 10 |  | — | — | 4 | — | 6 | 9 | — | — | 10 | 10 | 6 |
| 3 | 11 | 7 | — |  | 5 | — | 7 | — | — | 8 | 11 | — | 7 | 11 |
| 4 | — | 0 | — | 2 |  | — | 0 | 12 | 9 | — | 12 | 0 | — | 12 |
| 5 | 1 | — | 3 | — | — |  | 13 | 1 | 3 | 1 | 1 | 13 | 13 | — |
| 6 | — | 0 | — | 2 | 2 | 13 |  | — | 0 | 2 | 2 | 0 | 13 | — |
| 7 | 1 | — | 3 | — | 12 | 3 | — |  | 3 | 1 | 11 | — | — | 12 |
| 8 | — | 0 | 3 | — | 12 | 3 | 0 | 12 |  | — | 12 | 0 | — | 12 |
| 9 | 1 | — | — | 2 | — | 4 | 13 | 1 | — |  | 1 | 13 | 13 | — |
| 10 | 1 | — | — | 2 | 2 | 1 | 2 | 12 | 12 | 2 |  | — | — | 12 |
| 11 | — | 0 | 3 | — | 0 | 3 | 7 | — | 3 | 13 | — |  | 13 | — |
| 12 | 8 | 10 | 4 | 8 | — | 4 | 7 | — | — | 8 | — | 10 |  | — |
| 13 | 11 | 9 | 9 | 5 | 5 | — | — | 6 | 9 | — | 11 | — | — |  |

| FROM\TO | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0 |  | — | 4 | 8 | — | 4 | — | 6 | — | 8 | 11 | — | 4 | 6 | 8 |
| 1 | — |  | 9 | 5 | 5 | — | 7 | — | 9 | — | — | 10 | 7 | 5 | 5 |
| 2 | 6 | 10 |  | — | 4 | — | 6 | 9 | — | — | 10 | 10 | 6 | 6 |  |
| 3 | 11 | 7 | — |  | 5 | — | 7 | — | — | 8 | 11 | — | 7 | 11 | 5 |
| 4 | — | 0 | — | 2 |  | — | 0 | 12 | 0 | 2 | 12 | 0 | — | 12 | 5 |
| 5 | 1 | — | 3 | — | — |  | 13 | 1 | 3 | 1 | 1 | 13 | 13 | — | — |
| 6 | — | 0 | — | 2 | 2 | 14 |  | — | 14 | 2 | 2 | 0 | 13 | — | — |
| 7 | 1 | — | 3 | — | 12 | 3 | — |  | 3 | 1 | 1 | 3 | — | 12 | 6 |
| 8 | — | 0 | 3 | — | 12 | 14 | 0 | 12 |  | — | 12 | 0 | — | 12 | — |
| 9 | 1 | — | — | 2 | 2 | 13 | 13 | 1 | — |  | 1 | 13 | 13 | — | 8 |
| 10 | 1 | — | — | 2 | 2 | 14 | 2 | 12 | 14 | 2 |  | — | — | 12 | — |
| 11 | — | 0 | 3 | — | 0 | 3 | 13 | 3 | 3 | 13 | — |  | 13 | — | 10 |
| 12 | 8 | 10 | 4 | 8 | — | 4 | 7 | — | — | 8 | — | 10 |  | — | 8 |
| 13 | 11 | 9 | 9 | 5 | 5 | — | — | 6 | 9 | — | 11 | — | — |  | 5 |
| 14 | 6 | 10 | 10 | 8 | 5 | — | — | 6 | — | 8 | — | 10 | 10 | 6 |  |

Upgrading 2 Nodes at a Time

Because the data processing system suitable for use with methods and systems consistent with the present invention may contain two nodes, the network topologies described above can be easily upgraded two nodes at a time when the network initially has an even number of nodes. These two additional nodes become partner nodes within the same data processing system. As described in detail below, when adding two nodes, the network administrator removes four links from the network topology and adds nine new links, including an additional link (a partner link) between the two nodes. One skilled in the art will appreciate that the below-described upgrade sequences can be reversed to remove two partner nodes at a time.

Upgrading from 6 Nodes to 8 Nodes

To upgrade from six nodes to eight nodes, the network administrator utilizes the interim routing table provided below, removes links 2-0, 4-3, 3-1, and 5-2, adds links 6-0, 6-2, 6-3, 6-4, 7-1, 7-2, 7-3, 7-5, and 7-6, and then utilizes the routing table described above for a network of 8 nodes.

| FROM\TO | 0 | 1 | 2 | 3 | 4 | 5 |
|---|---|---|---|---|---|---|
| 0 |  | — | 3 | — | — | — |
| 1 | — |  | — | 2 | — | — |
| 2 | 1 | — |  | — | — | 4 |
| 3 | — | 0 | — |  | 5 | — |
| 4 | — | — | — | 2 |  | — |
| 5 | — | — | 3 | — | — |  |

Upgrading from 8 Nodes to 10 Nodes

To perform this upgrade, the network administrator utilizes the interim routing table provided below, removes links 5-0, 6-3, 4-1, and 7-2, adds links 8-0, 8-3, 8-5, 8-6, 9-1, 9-2, 9-4, 9-7, and 9-8, and then utilizes the routing table described above for a network of 10 nodes.

| FROM\TO | 0 | 1 | 2 | 3 | 4 | 5 | 6 | 7 |
|---|---|---|---|---|---|---|---|---|
| 0 |  | — | 3 | — | — | 4 | — | 6 |
| 1 | — |  | — | 2 | 5 | — | 7 | — |
| 2 | 1 | — |  | — | — | 4 | — | 6 |
| 3 | — | 0 | — |  | 5 | — | 7 | — |
| 4 | — | 0 | — | 2 |  | — | — | 6 |
| 5 | 1 | — | 3 | — | — |  | 7 | — |
| 6 | — | 0 | — | 2 | — | 4 |  | — |
| 7 | 1 | — | 3 | — | 5 | — | — |  |

Upgrading from 10 Nodes to 12 Nodes

To perform this upgrade, the network administrator utilizes the interim routing table provided below, removes links 2-1, 6-4, 7-5, and 3-0, adds links 10-1, 10-2, 10-5, 10-6, 11-0, 11-3, 11-4, 11-7, and 11-10, and then utilizes the routing table described above for a network of 12 nodes.

| FROM\TO | 0 | 1 | 2 | 3 | 4 | 5 | 6 | 7 | 8 | 9 |
|---|---|---|---|---|---|---|---|---|---|---|
| 0 |  | — | 4 | 8 | — | 4 | — | 6 | — | 8 |
| 1 | — |  | 9 | 5 | 5 | — | 7 | — | 9 | — |
| 2 | 6 | 9 |  | — | — | 4 | — | 6 | 9 | — |
| 3 | 8 | 7 | — |  | 5 | — | 7 | — | — | 8 |
| 4 | — | 0 | — | 2 |  | — | — | 0 | 9 | 9 |
| 5 | 1 | — | 3 | — | — |  | 8 | 1 | — | 8 |
| 6 | — | 0 | — | 2 | 2 | 8 |  | — | — | 8 |
| 7 | 1 | — | 3 | — | 9 | 3 | — |  | 9 | — |
| 8 | — | 0 | 3 | — | 5 | — | — | 6 |  | — |
| 9 | 1 | — | — | 2 | — | 4 | 7 | — | — |  |

Upgrading from 12 Nodes to 14 Nodes

To perform this upgrade, the network administrator utilizes the interim routing table provided below, removes links 11-4, 10-5, 8-6, and 9-7, adds links 12-4, 12-7, 12-8, 12-10, 13-5, 13-6, 13-9, 13-11, and 13-12, and then utilizes the routing table described above for a network of 14 nodes.

| FROM\TO | 0 | 1 | 2 | 3 | 4 | 5 | 6 | 7 | 8 | 9 | 10 | 11 |
|---|---|---|---|---|---|---|---|---|---|---|---|---|
| 0 | — | — | 4 | 8 | — | 4 | — | 6 | — | 8 | 11 | — |
| 1 | — | — | 9 | 5 | 5 | — | 7 | — | 9 | — | — | 10 |
| 2 | 4 | 10 | — | — | 4 | — | 6 | 9 | — | — | — | 10 |
| 3 | 8 | 7 | — | — | 5 | — | 7 | — | — | 8 | 11 | — |
| 4 | — | 0 | — | 2 | — | — | 0 | 0, 6 | 9 | — | 2 | 0 |
| 5 | 1 | — | 3 | — | — | — | 1, 7 | 1 | — | 8 | 1 | 3 |
| 6 | — | 0 | — | 2 | 2 | 2, 4 | — | — | 0 | 2 | — | 10 |
| 7 | 1 | — | 3 | — | 3, 5 | 3 | — | — | 3 | 1 | 11 | — |
| 8 | — | 0 | 3 | — | 5 | — | 0 | 3 | — | — | 0, 11 | 0 |
| 9 | 1 | — | — | 2 | — | 4 | 2 | 1 | — | — | 1 | 1, 10 |
| 10 | 1 | — | — | 2 | 2 | 1 | — | 6 | 2, 9 | 2 | — | — |
| 11 | — | 0 | 3 | — | 0 | 3 | 7 | — | 3 | 3, 8 | — | — |

Upgrading from 14 Nodes to 16 Nodes

To perform this upgrade, the network administrator utilizes the interim routing table provided below, removes links 8-5, 10-6, 9-4, and 11-7, adds links 14-5, 14-6, 14-8, 14-10, 15-4, 15-7, 15-9, 15-11, and 15-14, and then utilizes the routing table described Above for a network of 16 nodes.

| FROM\TO | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | — | — | 4 | 8 | — | 4 | — | 6 | — | 8 | 11 | — | 8 | 6 |
| 1 | — | — | 9 | 5 | 5 | — | 7 | — | 9 | — | — | 10 | 7 | 5 |
| 2 | 6 | 10 | — | — | 4 | — | 6 | 9 | — | — | — | 10 | 10 | 6 |
| 3 | 11 | 7 | — | — | 5 | — | 7 | — | — | 8 | 11 | — | 7 | 11 |
| 4 | — | 0 | — | 2 | — | — | 0 | 12 | 0 | 2 | 12 | 0 | — | 12 |
| 5 | 1 | — | 3 | — | — | — | 13 | 1 | 3 | 1 | 1 | 13 | 13 | — |
| 6 | — | 0 | — | 2 | 2 | 13 | — | — | 0 | 2 | 2 | 0 | 13 | — |
| 7 | 1 | — | 3 | — | 12 | 3 | — | — | 3 | 1 | 1 | 3 | — | 12 |
| 8 | — | 0 | 3 | — | 12 | 3 | 0 | 12 | — | — | 12 | 0 | — | 12 |
| 9 | 1 | — | — | 2 | 2 | 13 | 13 | 1 | — | — | 1 | 13 | 13 | — |
| 10 | 1 | — | — | 2 | 2 | 1 | 2 | 12 | 12 | 2 | — | — | — | 12 |
| 11 | — | 0 | 3 | — | 0 | 3 | 13 | 3 | 3 | 13 | — | — | 13 | — |
| 12 | 8 | 10 | 4 | 8 | — | 4 | 7 | — | — | 8 | — | 10 | — | — |
| 13 | 11 | 9 | 9 | 5 | 5 | — | — | 6 | 9 | — | 11 | — | — | — |

Although the present invention has been described with reference to a preferred embodiment thereof, those skilled in the art will know of various changes in form and detail which may be made without departing from the spirit and scope of the present invention as defined in the appended claims and their full scope of equivalents.

What is claimed is:

1. A distributed system comprising at least seven nodes in a network that is not fully connected, the nodes including a node 0, a node 1, a node 2, a node 3, a node 4, a node 5, and a node 6, the nodes being communicatively linked as follows:

node 0 is communicatively linked to node 1, node 3, node 4, node 5, and node 6;
   node 1 is communicatively linked to node 0, node 2, node 3, node 4, and node 5;
   node 2 is communicatively linked to node 1, node 3, node 4, node 5, and node 6;
   node 3 is communicatively linked to node 0, node 1, node 2, node 5, and node 6;
   node 4 is communicatively linked to node 0, node 1, node 2, node 5, and node 6;
   node 5 is communicatively linked to node 0, node 1, node 2, node 3, and node 4; and
   node 6 is communicatively linked to node 0, node 2, node 3, and node 4.

2. The distributed system of claim 1 wherein each of the nodes has five ports.

3. The distributed system of claim 1 wherein node 0 and node 1 communicate via a bus.

4. The distributed system of claim 1 wherein node 2 and node 3 communicate via a bus.

5. The distributed system of claim 1 wherein node 4 and node 5 communicate via a bus.

6. A distributed system comprising at least eight nodes in a network that is not fully connected, the nodes including anode 0, a node 1, a node 2, a node 3, a node 4, a node 5, a node 6, and a node 7, the nodes being communicatively linked as follows:

node 0 is communicatively linked to node 1, node 3, node 4, node 5, and node 6;
   node 1 is communicatively linked to node 0, node 2, node 4, node 5, and node 7;
   node 2 is communicatively linked to node 1, node 3, node 4, node 6, and node 7;
   node 3 is communicatively linked to node 0, node 2, node 5, node 6, and node 7;
   node 4 is communicatively linked to node 0, node 1, node 2, node 5, and node 6;
   node 5 is communicatively linked to node 0, node 2, node 3, node 4, and node 7;
   node 6 is communicatively linked to node 0, node 2, node 3, node 4, and node 7; and
   node 7 is communicatively linked to node 1, node 2, node 3, node 5, and node 6.

7. The distributed system of claim 6 wherein each of the nodes has five ports.

8. The distributed system of claim 6 wherein node 0 and node 1 communicate via a bus.

9. The distributed system of claim 6 wherein node 2 and node 3 communicate via a bus.

10. The distributed system of claim 6 wherein node 4 and node 5 communicate via a bus.

11. The distributed system of claim 6 wherein node 6 and node 7 communicate via a bus.

12. A distributed system comprising at least nine nodes in a network that is not fully connected, the nodes including a node 0, a node 1, a node 2, a node 3, a node 4, a node 5, a node 6, a node 7, and a node 8, the nodes being communicatively linked as follows:

node 0 is communicatively linked to node 1, node 3, node 4, node 6, and node 8;

node 1 is communicatively linked to node 0, node 2, node 4, node 5, and node 7;

node 2 is communicatively linked to node 1, node 3, node 4, node 6, and node 7;

node 3 is communicatively linked to node 0, node 2, node 5, node 7, and node 8;

node 4 is communicatively linked to node 0, node 1, node 2, node 5, and node 6;

node 5 is communicatively linked to node 1, node 3, node 4, node 7, and node 8;

node 6 is communicatively linked to node 0, node 2, node 4, node 7, and node 8;

node 7 is communicatively linked to node 1, node 2, node 3, node 5, and node 6;

node 8 is communicatively linked to node 0, node 3, node 5, and node 6.

13. The distributed system of claim 12 wherein each of the nodes has five ports.

14. The distributed system of claim 12 wherein node 0 and node 1 are partner nodes.

15. The distributed system of claim 12 wherein node 2 and node 3 are partner nodes.

16. The distributed system of claim 12 wherein node 4 and node 5 are partner nodes.

17. The distributed system of claim 12 wherein node 6 and node 7 are partner nodes.

18. A distributed system comprising at least ten nodes in a network that is not fully connected, the nodes including a node 0, a node 1, a node 2, a node 3, a node 4, a node 5, a node 6, a node 7, a node 8, and a node 9, the nodes being communicatively linked as follows:

node 0 is communicatively linked to node 1, node 3, node 4, node 6, and node 8;

node 1 is communicatively linked to node 0, node 2, node 5, node 7, and node 9;

node 2 is communicatively linked to node 1, node 3, node 4, node 6, and node 9;

node 3 is communicatively linked to node 0, node 2, node 5, node 7, and node 8;

node 4 is communicatively linked to node 0, node 2, node 5, node 6, and node 9;

node 5 is communicatively linked to node 1, node 3, node 4, node 7, and node 8;

node 6 is communicatively linked to node 0, node 2, node 4, node 7, and node 8;

node 7 is communicatively linked to node 1, node 3, node 5, node 6, and node 9;

node 8 is communicatively linked to node 0, node 3, node 5, node 6, and node 9; and node 9 is communicatively linked to node 1, node 2, node 4, node 7, and node 8.

19. The distributed system of claim 18 wherein each of the nodes has five ports.

20. The distributed system of claim 18 wherein node 0 and node 1 are partner nodes.

21. The distributed system of claim 18 wherein node 2 and node 3 are partner nodes.

22. The distributed system of claim 18 wherein node 4 and node 5 are partner nodes.

23. The distributed system of claim 18 wherein node 6 and node 7 are partner nodes.

24. The distributed system of claim 18 wherein node 8 and node 9 are partner nodes.

25. A distributed system comprising at least eleven nodes, in a network that is not fully connected, the nodes including a node 0, a node, 1, a node 2, a node 3, a node 4, a node 5, a node 6, a node 7, a node 8, a node 9, and a node 10, the nodes being communicatively linked as follows:

node 0 is communicatively linked to node 1, node 3, node 4, node 6, and node 8;

node 1 is communicatively linked to node 0, node 5, node 7, node 9, and node 10;

node 2 is communicatively linked to node 3, node 4, node 6, node 9, and node 10;

node 3 is communicatively linked to node 0, node 2, node 5, node 7, and node 8;

node 4 is communicatively linked to node 0, node 2, node 5, node 7, and node 9;

node 5 is communicatively linked to node 1, node 3, node 4, node 8, and node 10;

node 6 is communicatively linked to node 0, node 2, node 7, node 8, and node 10;

node 7 is communicatively linked to node 1, node 3, node 4, node 6, and node 9;

node 8 is communicatively linked to node 0, node 3, node 5, node 6, and node 9;

node 9 is communicatively linked to node 1, node 2, node 4, node 7, and node 8; and node 10 is communicatively linked to node 1, node 2, node 5, and node 6.

26. The distributed system of claim 25 wherein each of the nodes has five ports.

27. The distributed system of claim 25 wherein node 0 and node 1 communicate via a bus.

28. The distributed system of claim 25 wherein node 2 and node 3 communicate via a bus.

29. The distributed system of claim 25 wherein node 4 and node 5 communicate via a bus.

30. The distributed system of claim 25 wherein node 6 and node 7 communicate via a bus.

31. The distributed system of claim 25 wherein node 8 and node 9 communicate via a bus.

32. A distributed system comprising at least twelve nodes in a network that is not fully connected the nodes including a node 0, a node 1, a node 2, a node 3, a node 4, a node 5, a node 6, a node 7, a node 8, a node 9, a node 10, and a node 11, the nodes being communicatively linked as follows:

node 0 is communicatively linked to node 1, node 4, node 6, node 8, and node 11;

node 1 is communicatively linked to node 1, node 5, node 7, node 9, and node 10;

node 2 is communicatively linked to node 3, node 4, node 6, node 9, and node 10;

node 3 is communicatively linked to node 2, node 5, node 7, node 8, and node 11;

node 4 is communicatively linked to node 0, node 2, node 5, node 9, and node 11;

node 5 is communicatively linked to node 1, node 3, node 4, node 8, and node 10;

node 6 is communicatively linked to node 0, node 2, node 7, node 8, and node 10;

node 7 is communicatively linked to node 1, node 3, node 6, node 9, and node 11;

node 8 is communicatively linked to node 0, node 3, node 5, node 6, and node 9;

node 9 is communicatively linked to node 1, node 2, node 4, node 7, and node 8;

node 10 is communicatively linked to node 1, node 2, node 5, node 6, and node 11; and node 11 is communicatively linked to node 0, node 3, node 4, node 7, and node 10.

33. The distributed system of claim 32 wherein each of the nodes has five ports.

34. The distributed system of claim 32 wherein node 0 and node 1 communicate via a bus.

35. The distributed system of claim 32 wherein node 2 and node 3 communicate via a bus.

36. The distributed system of claim 32 wherein node 4 and node 5 communicate via a bus.

37. The distributed system of claim 32 wherein node 6 and node 7 communicate via a bus.

38. The distributed system of claim 32 wherein node 8 and node 9 communicate via a bus.

39. The distributed system of claim 32 wherein node 10 and node 11 communicate via a bus.

40. A distributed system comprising at least thirteen nodes in a network that is not fully connected, the nodes including a node 0, a node 1, anode 2, a node 3, a node 4, a node 5, a node 6, a node 7, a node 8, a node 9, a node 10, a node 11, and a node 12, the nodes being communicatively linked as follows:

node 0 is communicatively linked to node 1, node 4, node 6, node 8, and node 11;

node 1 is communicatively linked to node 0, node 5, node 7, node 9, and node 10;

node 2 is communicatively linked to node 3, node 4, node 6, node 9, and node 10;

node 3 is communicatively linked to node 2, node 5, node 7, node 8, and node 11;

node 4 is communicatively linked to node 0, node 2, node 5, node 9, and node 12;

node 5 is communicatively linked to node 1, node 3, node 4, node 6, and node 8;

node 6 is communicatively linked to node 0, node 2, node 5, node 7, and node 10;

node 7 is communicatively linked to node 1, node 3, node 6, node 11, and node 12;

node 8 is communicatively linked to node 0, node 3, node 5, node 9, and node 12;

node 9 is communicatively linked to node 1, node 2, node 4, node 8, and node 11;

node 10 is communicatively linked to node 1, node 2, node 6, node 11, and node 12;

node 11 is communicatively linked to node 0, node 3, node 7, node 9, and node 10; and node 12 is communicatively linked to node 4, node 7, node 8, and node 10.

41. The distributed system of claim 40 wherein each of the nodes has five ports.

42. The distributed system of claim 40 wherein node 0 and node 1 communicate via a bus.

43. The distributed system of claim 40 wherein node 2 and node 3 communicate via a bus.

44. The distributed system of claim 40 wherein node 4 and node 5 communicate via a bus.

45. The distributed system of claim 40 wherein node 6 and node 7 communicate via a bus.

46. The distributed system of claim 40 wherein node 8 and node 9 communicate via a bus.

47. The distributed system of claim 40 wherein node 10 and node 11 communicate via a bus.

48. A distributed system comprising at least fourteen nodes in a network that is not fully connected, the nodes including a node 0, a node 1, a node 2, a node 3, a node 4, a node 5, a node 6, a node 7, a node 8, a node 9, a node 10, a node 11, a node 12, and a node 13, the nodes being communicatively linked as follows:

node 0 is communicatively linked to node 1, node 4, node 6, node 8, and 11;

node 1 is communicatively linked to node 0, node 5, node 7, node 9, and node 10;

node 2 is communicatively linked to node 3, node 4, node 6, node 9, and node 10;

node 3 is communicatively linked to node 2, node 5, node 7, node 8, and node 11;

node 4 is communicatively linked to node 0, node 2, node 5, node 9, and node 12;

node 5 is communicatively linked to node 1, node 3, node 4, node 8, and node 13;

node 6 is communicatively linked to node 0, node 2, node 7, node 10, and node 13;

node 7 is communicatively linked to node 1, node 3, node 6, node 11, and node 12;

node 8 is communicatively linked to node 0, node 3, node 5, node 9, and node 12;

node 9 is communicatively linked to node 1, node 2, node 4, node 8, and node 13;

node 10 is communicatively linked to node 1, node 2, node 6, node 11, and node 12;

node 11 is communicatively linked to node 0, node 3, node 7, node 10, and node 13;

node 12 is communicatively linked to node 4, node 7, node 8, node 10, and node 13; and node 13 is communicatively linked to node 5, node 6, node 9, node 11, and node 12.

49. The distributed system of claim 48 wherein each of the nodes has five ports.

50. The distributed system of claim 48 wherein node 0 and node 1 are partner nodes.

51. The distributed system of claim 48 wherein node 2 and node 3 are partner nodes.

52. The distributed system of claim 48 wherein node 4 and node 5 are partner nodes.

53. The distributed system of claim 48 wherein node 6 and node 7 ate partner nodes.

54. The distributed system of claim 48 wherein node 8 and node 9 are partner nodes.

55. The distributed system of claim 48 wherein node 10 and node 11 are partner nodes.

56. The distributed system of claim 48 wherein node 12 and node 13 are partner nodes.

57. A distributed system comprising at least fifteen nodes in a network that is not fully connected, the nodes including a node 0, a node 1, a node 2, a node 3, a node 4, a node 5, a node 6, a node 7, a node 8, a node 9, a node 10, a node 11, a node 12, a node 13, and a node 14, the nodes being communicatively linked as follows:

node 0 is communicatively linked to node 1, node 4, node 6, node 8, and node 11;

node 1 is communicatively linked to node 0, node 5, node 7, node 9, and node 10;

node 2 is communicatively linked to node 3, node 4, node 6, node 9, and node 10;

node 3 is communicatively linked to node 2, node 5, node 7, node 8, and node 11;

node 4 is communicatively linked to node 0, node 2, node 5, node 9, and node 12;

node 5 is communicatively linked to node 1, node 3, node 4, node 13, and node 14;

node 6 is communicatively linked to node 0, node 2, node 7, node 13, and node 14;

node 7 is communicatively linked to node 1, node 3, node 6, node 11, and node 12;

node 8 is communicatively linked to node 0, node 3, node 9, node 12, and node 14;

node 9 is communicatively linked to node 1, node 2, node 4, node 8, and node 13;

node 10 is communicatively linked to node 1, node 2, node 11, node 12, and node 14;

node 11 is communicatively linked to node 0, node 3, node 7, node 10, and node 13;

node 12 is communicatively linked to node 4, node 7, node 8, node 10, and node 13;

node 13 is communicatively linked to node 5, node 6, node 9, node 11, and node 12; and node 14 is communicatively linked to node 5, node 6, node 8, and node 10.

58. The distributed system of claim 57 wherein each of the nodes has five ports.

59. The distributed system of claim 57 wherein node 0 and node 1 are partner nodes.

60. The distributed system of claim 57 wherein node 2 and node 3 are partner nodes.

61. The distributed system of claim 57 wherein node 4 and node 5 are partner nodes.

62. The distributed system of claim 57 wherein node 6 and node 7 are partner nodes.

63. The distributed system of claim 57 wherein node 8 and node 9 are partner nodes.

64. The distributed system of claim 57 wherein node 10 and node 11 are partner nodes.

65. The distributed system of claim 57 wherein node 12 and node 13 are partner nodes.

66. A method for distributed system configuration, comprising the steps of:

creating a set of network topologies, each associated with one group of nodes, each group having a different number of nodes, each network topology configured based on performance characteristics, wherein each of the set of network topologies does not fully connect the associated group of nodes;

selecting one of the set of network topologies for a network with network nodes based on a number of the network nodes in the network; and configuring the network using the selected network topology.

67. The method of claim 66 wherein each of the set of network topologies is configured based on a diameter of the network topology.

68. The method of claim 66 wherein each of the set of network topologies is configured based on a bisection bandwidth of the network topology.

69. The method of claim 66 wherein each of the set of network topologies is configured based on whether the network topology is symmetric.

70. The method of claim 69 wherein each of the set of network topologies is configured based on whether the network topology is node symmetric.

71. The method of claim 69 wherein each of the set of network topologies is configured based on whether the network topology is edge symmetric.

72. The method of claim 66 wherein each of the set of network topologies is configured based on an average path length of the network topology.

73. The method of claim 66 wherein the number of nodes in each group form a sequence.

74. The method of claim 73 wherein the sequence begins at seven nodes and ends at sixteen nodes.

75. A method for distributed system configuration, comprising the steps of:

creating a set of network topologies, each associated with one group of nodes, each group having a different number of nodes, each network topology configured to facilitate reconfiguration of the associated group, wherein each of the set of network topologies does not fully connect the associated group of nodes;

selecting one of the set of network topologies for a network with network nodes based on a number of the network nodes in the network; and configuring the network using the selected topology.

76. The method of claim 75 wherein each network topology is configured to facilitate upgrading the network.

77. The method of claim 75 wherein each network topology is configured to facilitate downgrading the network.

78. The method of claim 75 wherein the number of nodes in each group form a sequence.

79. The method of claim 78, wherein the sequence starts at seven nodes and ends at sixteen nodes.

80. A method for distributed system configuration, comprising the steps of:

creating a set of network topologies, each associated with one group of nodes, each group having a different number of nodes, each network topology configured based on performance characteristics, wherein each of the set of network topologies does not fully connect the associated group of nodes;

selecting one of the set of network topologies for a network with network nodes based on a number of the network nodes in the network; and configuring the network using the selected network topology, wherein each of the set of network topologies is configured based on one of a diameter of the network topology, a bisection bandwidth of the network topology, an average path length of the network topology, and whether the network topology is symmetric.

81. A method for distributed system configuration, comprising the steps of:

creating a set of network topologies, each associated with one group of nodes, each group having a different number of nodes that form a sequence, each network topology configured based on performance characteristics, wherein each of the set of network topologies does not fully connect the associated group of nodes;

selecting one of the set of network topologies for a network with network nodes based on a number of the network nodes in the network; and configuring the network using the selected network topology.

82. A method for distributed system configuration, comprising the steps of:

creating a set of network topologies, each associated with one group of nodes, each group having a different number of nodes that form a sequence, each network topology configured to facilitate reconfiguration of the associated group, wherein each of the set of network topologies does not fully connect the associated group of nodes;

selecting one of the set of network topologies for a network with network nodes based on a number of the network nodes in the network; and configuring the network using the selected topology.

* * * * *

UNITED STATES PATENT AND TRADEMARK OFFICE
CERTIFICATE OF CORRECTION

PATENT NO. : 6,584,073 B1
DATED : June 24, 2003
INVENTOR(S) : Guy L. Steele, Jr. et al.

It is certified that error appears in the above-identified patent and that said Letters Patent is hereby corrected as shown below:

<u>Title page,</u>
Item [54], title "NETWORK TOPOLOGIES" should read -- IMPROVED NETWORK TOPOLOGIES --;
Item [75], "Chelmsford, MA" should read -- Acton, MA --;
Item [57], ABSTRACT,
Line 6, "removing," should read -- removing --;

<u>Column 20,</u>
Line 46, "anode" should read -- a node --;
Line 60, "node 2," should read -- node 1, --;

<u>Column 21,</u>
Line 30, "node 6;" should read -- node 6; and --;

<u>Column 22,</u>
Line 15, "nodes," should read -- nodes --;
Line 56, "connected" should read -- connected, --;
Line 62, "node 1," should read -- node 0, --;

<u>Column 23,</u>
Line 34, "anode" should read -- a node --;

<u>Column 24,</u>
Line 20, "and 11;" should read -- and node 11; --;
Line 58, "ate" should read -- are --.

Signed and Sealed this

Twenty-fifth Day of November, 2003

JAMES E. ROGAN
*Director of the United States Patent and Trademark Office*